`US008932969B2`

(12) United States Patent
Koyama et al.

(10) Patent No.: US 8,932,969 B2
(45) Date of Patent: Jan. 13, 2015

(54) GLASS SUBSTRATE FOR FLAT PANEL DISPLAY AND METHOD FOR MANUFACTURING SAME

(75) Inventors: Akihiro Koyama, Takarazuka (JP); Satoshi Ami, Yokkaichi (JP); Manabu Ichikawa, Yokkaichi (JP)

(73) Assignee: AvanStrate Inc., Yokkaichi-shi (JP)

( * ) Notice: Subject to any disclaimer, the term of this patent is extended or adjusted under 35 U.S.C. 154(b) by 43 days.

(21) Appl. No.: 13/537,774

(22) Filed: Jun. 29, 2012

(65) Prior Publication Data

US 2013/0029830 A1 Jan. 31, 2013

Related U.S. Application Data

(60) Provisional application No. 61/512,251, filed on Jul. 27, 2011.

(30) Foreign Application Priority Data

Jul. 1, 2011 (JP) .................................. 2011-147767
Mar. 15, 2012 (JP) .................................. 2012-059232

(51) Int. Cl.
*C03C 3/091* (2006.01)
*C03C 3/085* (2006.01)
*C03C 3/087* (2006.01)
*C03C 3/093* (2006.01)

(52) U.S. Cl.
CPC ................. *C03C 3/091* (2013.01); *C03C 3/093* (2013.01)
USPC ................................. 501/66; 501/69; 501/70

(58) Field of Classification Search
CPC ........ C03C 3/089; C03C 3/091; C03C 3/093; C03C 3/085; C03C 3/087
USPC ..................... 501/65, 66, 67, 69, 70
See application file for complete search history.

(56) References Cited

U.S. PATENT DOCUMENTS

| 5,824,127 | A | 10/1998 | Bange et al. |
|---|---|---|---|
| 5,851,939 | A | 12/1998 | Miwa |
| 2005/0096209 | A1 | 5/2005 | Kase et al. |
| 2008/0206494 | A1* | 8/2008 | Kurachi et al. .............. 428/1.62 |
| 2009/0143214 | A1* | 6/2009 | Niida et al. ...................... 501/56 |
| 2009/0176038 | A1 | 7/2009 | Komori et al. |
| 2011/0143908 | A1 | 6/2011 | Koyama et al. |

FOREIGN PATENT DOCUMENTS

| CN | 101568495 A | 10/2009 |
|---|---|---|
| CN | 101925546 A | 12/2010 |
| JP | 2002-201040 A | 7/2002 |
| JP | 05-064579 A | 3/2003 |
| JP | 2003137591 A | 5/2003 |
| JP | 2003-526702 A | 9/2003 |
| JP | 2004-189535 A | 7/2004 |
| JP | 2006-265001 A | 10/2006 |
| JP | 2007039324 A | 2/2007 |
| JP | 2008105860 A | 5/2008 |
| JP | 2009-149512 A | 7/2009 |
| JP | 2009-203080 A | 9/2009 |
| JP | 2010-275167 A | 12/2010 |
| JP | 2011-126728 A | 6/2011 |
| KR | 10-2011-0068925 A | 6/2011 |
| TW | 200909373 A | 3/2009 |
| TW | 200932699 A | 8/2009 |
| WO | 03/104157 A1 | 12/2003 |
| WO | 2009/078421 A1 | 6/2009 |

OTHER PUBLICATIONS

Decision of Rejection issued in corresponding Taiwanese Patent Application No. 101123759 dated Oct. 8, 2013.
Taiwanese Office Action dated May 15, 2013, issued in Taiwanese Application No. 101123759.
Korean Office Action dated Jun. 20, 2013, issued in Korean Application No. 10-2012-7031516.
International Search Report for Entry of PCT/JP2012/066737 dated Sep. 25, 2012.
Form PCT/ISA/220.
Form PCT/ISA/237.
Office Action issued in corresponding Chinese Patent Application No. 201280002211.8 dated Aug. 26, 2013.
Communication dated Apr. 11, 2014, issued by the State Intellectual Property Office of the People's Republic of China in corresponding Application No. 201280002211.8.
Communication dated Jul. 23, 2014, issued by the Korean Intellectual Property Office in corresponding Application No. 10-2012-7031553.
Third Office Action, dated Sep. 4, 2014, issued in corresponding CN Application No. 201280002211.8, 9 pages in English and Chinese.
Notice of Reasons for Rejection issued in corresponding Japanese Patent Application No. 2012-244841 dated Oct. 17, 2014.

* cited by examiner

*Primary Examiner* — Noah Wiese
(74) *Attorney, Agent, or Firm* — Sughrue Mion, PLLC

(57) ABSTRACT

Provided are: a glass substrate for p-Si TFT flat panel displays that is composed of a glass having high characteristic temperatures in the low-temperature viscosity range, typified by the strain point and glass transition point, having a small heat shrinkage rate, and being capable of avoiding the occurrence of the problem regarding the erosion/wear of a melting tank at the time of melting through direct electrical heating; and a method for manufacturing same. The present glass substrate is composed of a glass comprising 52-78 mass % of $SiO_2$, 3-25 mass % of $Al_2O_3$, 3-15 mass % of $B_2O_3$, 3-25 mass % of RO, wherein RO is total amount of MgO, CaO, SrO, and BaO, 0.01-1 mass % of $Fe_2O_3$, and 0-0.3 mass % of $Sb_2O_3$, and substantially not comprising $As_2O_3$, the glass having a mass ratio $(SiO_2+Al_2O_3)/B_2O_3$ in a range of 7-30 and a mass ratio $(SiO_2+Al_2O_3)/RO$ equal to or greater than 6. The present method for manufacturing a glass substrate involves: a melting step of obtaining a molten glass by melting, by employing at least direct electrical heating, glass raw materials blended so as to provide the aforementioned glass composition; a forming step of forming the molten glass into a flat-plate glass; and an annealing step of annealing the flat-plate glass.

12 Claims, No Drawings

GLASS SUBSTRATE FOR FLAT PANEL DISPLAY AND METHOD FOR MANUFACTURING SAME

CROSS-REFERENCE TO RELATED APPLICATIONS

The present application claims the benefit of priority of U.S. Provisional Application Ser. No. 61/512,251 filed on Jul. 27, 2011, Japanese Patent Application No. 2011-147767 filed on Jul. 1, 2011, and Japanese Patent Application No. 2012-059232 filed on Mar. 15, 2012, the entire contents of which are hereby particularly incorporated by reference.

TECHNICAL FIELD

The present invention relates to a glass substrate for flat panel displays, and particularly to a glass substrate for polysilicon thin-film (described hereinafter as p-Si) flat panel displays, and to a method for manufacturing same. More specifically, the invention relates to a glass substrate used for flat displays manufactured by forming p-Si on the substrate surface, and to a method for manufacturing same. More specifically, the invention relates to a glass substrate for polysilicon thin-film-transistor (referred to hereinafter as p-Si TFT) flat panel displays, and to a method for manufacturing same. More specifically, the invention relates to a glass substrate used for flat displays manufactured by forming p-Si TFTs on the substrate surface, and to a method for manufacturing same. More specifically, the present invention relates to a glass substrate for p-Si TFT flat panel displays wherein the p-Si TFT flat panel display is a liquid crystal display, and to a method for manufacturing same. Alternatively, the present invention relates to a glass substrate for organic EL displays, and to a method for manufacturing same. Alternatively, the present invention relates to a glass substrate for oxide semiconductor thin-film-transistor flat panel displays. More specifically, the invention relates to a glass substrate used for flat displays manufactured by forming oxide semiconductor thin-film transistors on the substrate surface, and to a method for manufacturing same.

BACKGROUND ART

Displays incorporated in small devices, such as mobile devices, employ p-Si (polysilicon) for manufacturing thin film transistors (TFTs) for reasons such as reducing power consumption. At present, the manufacturing of p-Si TFT flat panel displays requires a heat treatment at relatively high temperatures of 400-600° C. Glass with excellent heat resistance is used for glass substrates for manufacturing p-Si TFT flat panel displays. It is known, however, that glass substrates used for conventional a-Si (amorphous silicon) TFT flat panel displays do not have sufficiently high strain points, and thus, significant heat shrinkage occurs due to the heat treatment at the time of manufacturing p-Si TFT flat panel displays, thus giving rise to the problem of uneven pixel pitch.

In recent years, a higher degree of definition is demanded of displays for small devices. Thus, it is desired to minimize unevenness in pixel pitch, and the inhibition of heat shrinkage of the glass substrate at the time of manufacturing displays, which is a cause of unevenness in pixel pitch, has been an issue.

The heat shrinkage of a glass substrate can generally be inhibited by increasing characteristic temperatures in the low-temperature-viscosity range (referred to hereinafter as "low-temperature-viscosity characteristic temperatures"), typified by the strain point and Tg (glass transition point) of the glass substrate. As an example of glass having a high strain point, Patent Literature 1 discloses a non-alkali glass having a strain point of 680° C. or higher.

Patent Literature 1: Japanese Patent Application Laid-Open Publication JP-A-2010-6649

SUMMARY OF INVENTION

Problem to be Solved by Invention

In order to increase the low-temperature-viscosity characteristic temperatures of a glass substrate, typified by the strain point and Tg (glass transition point) thereof, it is generally necessary to increase the content of $SiO_2$ and $Al_2O_3$ in the glass. (Hereinbelow, the strain point is described as a representative example of the "low-temperature-viscosity characteristic temperature".) The glass disclosed in Patent Literature 1 comprises 58-75 mass % of $SiO_2$ and 15-19 mass % of $Al_2O_3$ (see claim 1). As a result, the specific resistance of the molten glass tends to increase. In recent years, direct electrical heating is often employed for the efficient melting of glass. Inventors have revealed from their studies that, in the case of direct electrical heating, an increase in the specific resistance of molten glass may cause a current to pass through refractory materials constituting a melting tank—and not through the molten glass—and this may give rise to a problem that the melting tank is subjected to erosion and wear.

The invention disclosed in Patent Literature 1, however, does not take into consideration the specific resistance of the molten glass. Thus, there is a strong concern that, if the glass disclosed in Patent Literature 1 is manufactured through melting by direct electrical heating, the aforementioned problem regarding the erosion/wear of the melting tank will occur.

Moreover, it is desired to further increase the low-temperature-viscosity characteristic temperature of glass—i.e., to provide glasses and glass substrates having higher strain points and Tg—and there is a growing concern over the occurrence of the aforementioned problem regarding the erosion/wear of the melting tank.

Thus, an objective of the present invention is to provide a glass substrate for flat panel displays—particularly a glass substrate for p-Si TFT flat panel displays—that is composed of a glass having a high strain point, is capable of inhibiting the heat shrinkage of the glass substrate at the time of display manufacture, and is capable of being manufactured while avoiding the occurrence of the problem regarding the erosion/wear of the melting tank at the time of melting through direct electrical heating, and a method for manufacturing same.

Means for Solving Problem

The present invention encompasses the following.
[1]
A glass substrate for a p-Si TFT flat panel display, the glass substrate being composed of a glass comprising
52-78 mass % of $SiO_2$,
3-25 mass % of $Al_2O_3$,
3-15 mass % of $B_2O_3$,
3-25 mass % of RO, wherein RO is total amount of MgO, CaO, SrO, and BaO,
0.01-1 mass % of $Fe_2O_3$, and
0-0.3 mass % of $Sb_2O_3$, and substantially not comprising $As_2O_3$,
the glass having a mass ratio $(SiO_2+Al_2O_3)/B_2O_3$ in a range of 7-30 and a mass ratio $(SiO_2+Al_2O_3)/RO$ equal to or greater than 6. (This is the glass substrate according to a first embodiment of the present invention. Hereinbelow, the description "glass substrate of the present invention" refers to the glass substrate according to the first embodiment of the present invention.)

[2]

The glass substrate according to item [1], wherein the glass substantially does not comprise $Sb_2O_3$.

[3]

A glass substrate for a p-Si TFT flat panel display, the glass substrate being composed of a glass comprising
52-78 mass % of $SiO_2$,
3-25 mass % of $Al_2O_3$,
3-15 mass % of $B_2O_3$,
3-13 mass % of RO, wherein RO is total amount of MgO, CaO, SrO, and BaO, and
0.01-1 mass % of $Fe_2O_3$, and substantially not comprising $Sb_2O_3$ and $As_2O_3$,
the glass having a mass ratio $(SiO_2+Al_2O_3)/B_2O_3$ in a range of 8.9-20 and a mass ratio $(SiO_2+Al_2O_3)/RO$ equal to or greater than 7.5. (This is an example of the glass substrate according to the first embodiment of the present invention.)

[4]

The glass substrate according to any one of items [1] to [3], wherein:
the content of $SiO_2$ is 58-72 mass %;
the content of $Al_2O_3$ is 10-23 mass %; and
the content of $B_2O_3$ is from 3 to less than 11 mass %.

[5]

The glass substrate according to any one of items [1] to [4], wherein the glass has:
a total content of $SiO_2$ and $Al_2O_3$ equal to or greater than 75 mass %
a total content of RO, ZnO, and $B_2O_3$ of 7 to less than 20 mass %; and
a content of $B_2O_3$ of 3 to less than 11 mass %.

[6]

The glass substrate according to any one of items [1] to [5], wherein the glass has a strain point of 688° C. or higher.

[7]

The glass substrate according to any one of items [1] to [6], wherein the glass has 0.01-0.8 mass % of $R_2O$ content, wherein $R_2O$ is total amount of $Li_2O$, $Na_2O$, and $K_2O$.

[8]

The glass substrate according to any one of items [1] to [7], wherein the glass exhibits a β-OH value of 0.05-0.4 $mm^{-1}$.

[9]

The glass substrate according to any one of items [1] to [8], wherein the glass has a content of $ZrO_2$ of less than 0.2 mass %.

[10]

The glass substrate according to any one of items [1] to [9], wherein the glass has a total content of SrO and BaO of 0 to less than 2 mass %.

[11]

A glass substrate for a p-Si TFT flat panel display, the glass substrate being composed of a glass comprising
52-78 mass % of $SiO_2$,
3-25 mass % of $Al_2O_3$,
3-15 mass % of $B_2O_3$,
3-13 mass % of RO, wherein RO is total amount of MgO, CaO, SrO, and BaO, and
0.01-1 mass % of $Fe_2O_3$, and substantially not comprising $Sb_2O_3$ and $As_2O_3$,
wherein the heat shrinkage rate after performing a heat treatment in which the temperature is raised and lowered at a rate of 10° C./min and is kept at 550° C. for 2 hours is equal to or less than 75 ppm, the heat shrinkage rate being expressed by the following equation. (This is the glass substrate according to a second embodiment of the present invention.)

$$\text{Heat shrinkage rate (ppm)} = \{\text{Amount of shrinkage of glass before and after heat treatment/Length of glass before heat treatment}\} \times 10^6. \quad \text{[Equation]}$$

[12]

The glass substrate according to item [11], wherein the heat shrinkage rate is equal to or less than 60 ppm.

[13]

The glass substrate according to item [11] or [12], wherein the heat shrinkage rate is a value found by performing said heat treatment after performing an annealing process of: keeping the glass substrate at Tg for 30 minutes; cooling the glass substrate to 100° C. below Tg at 100° C./min; and then leaving the glass substrate to cool to room temperature.

[14]

A glass substrate for a p-Si TFT flat panel display, the glass substrate being composed of a glass comprising
57-75 mass % of $SiO_2$,
8-25 mass % of $Al_2O_3$,
3-15 mass % of $B_2O_3$,
3-25 mass % of RO, wherein RO is total amount of MgO, CaO, SrO, and BaO,
0-15 mass % of MgO,
0-20 mass % of CaO,
0-3 mass % of a total amount of SrO and BaO,
0.01-1 mass % of $Fe_2O_3$, and
0-0.3 mass % of $Sb_2O_3$,
the glass substantially not comprising $As_2O_3$. (This is the glass substrate according to a third embodiment of the present invention.)

[15]

A glass substrate for a p-Si TFT flat panel display, the glass substrate being composed of a glass comprising
57-75 mass % of $SiO_2$,
8-25 mass % of $Al_2O_3$,
3 to less than 10 mass % of $B_2O_3$,
3-25 mass % of RO, wherein RO is total amount of MgO, CaO, SrO, and BaO,
0-15 mass % of MgO,
0-20 mass % of CaO,
0-3 mass % of a total amount of SrO and BaO, and
0.01-1 mass % of $Fe_2O_3$,
the glass substantially not comprising $Sb_2O_3$ and $As_2O_3$. (This is an example of the glass substrate according to the third embodiment of the present invention.)

[16]

The glass substrate according to any one of items [1] to [15], wherein the glass substrate is for a TFT liquid crystal display.

[17]

A method for manufacturing a glass substrate for a p-Si TFT flat panel display, the method involving:
a melting step of obtaining a molten glass by melting, by employing at least direct electrical heating, glass raw materials blended so as to provide a glass comprising
52-78 mass % of $SiO_2$,
3-25 mass % of $Al_2O_3$,
3-15 mass % of $B_2O_3$,
3-25 mass % of RO, wherein RO is total amount of MgO, CaO, SrO, and BaO,
0.01-1 mass % of $Fe_2O_3$, and
0-0.3 mass % of $Sb_2O_3$, and substantially not comprising $As_2O_3$, the glass having a mass ratio $(SiO_2+Al_2O_3)/B_2O_3$ in a range of 7-30 and a mass ratio $(SiO_2+Al_2O_3)/RO$ equal to or greater than 6;

a forming step of forming the molten glass into a flat-plate glass; and an annealing step of annealing the flat-plate glass.

[18]

A method for manufacturing a glass substrate for a p-Si TFT flat panel display, the method involving:

a melting step of obtaining a molten glass by melting, by employing at least direct electrical heating, glass raw materials blended so as to provide a glass comprising 52-78 mass % of $SiO_2$, 3-25 mass % of $Al_2O_3$, 3-15 mass % of $B_2O_3$, 3-13 mass % of RO, wherein RO is total amount of MgO, CaO, SrO, and BaO, and 0.01-1 mass % of $Fe_2O_3$, and substantially not comprising $Sb_2O_3$ and $As_2O_3$, the glass having a mass ratio $(SiO_2+Al_2O_3)/B_2O_3$ in a range of 8.9-20 and a mass ratio $(SiO_2+Al_2O_3)/RO$ equal to or greater than 7.5;

a forming step of forming the molten glass into a flat-plate glass; and an annealing step of annealing the flat-plate glass.

[19]

The manufacturing method according to item [17] or [18], wherein the specific resistance of the molten glass in a molten state at 1550° C. is 50-300 Ω·cm.

[20]

The manufacturing method according to any one of items [17] to [19], wherein a heat shrinkage reduction process of reducing the heat shrinkage rate of the glass substrate by controlling the cooling rate of the flat-plate glass is performed in the annealing step.

[21]

The manufacturing method according to item [20], wherein the heat shrinkage reduction process performed in the annealing step is a process in which the cooling rate in a central section of the flat-plate glass is set to 50-300° C./minute within a temperature range of from Tg to 100° C. below Tg.

[22]

A glass substrate for a flat panel display, the glass substrate being composed of a glass comprising 52-78 mass % of $SiO_2$, 3-25 mass % of $Al_2O_3$, 3-15 mass % of $B_2O_3$, 3-25 mass % of RO, wherein RO is total amount of MgO, CaO, SrO, and BaO, 0.01-1 mass % of $Fe_2O_3$, and 0-0.3 mass % of $Sb_2O_3$, and substantially not comprising $As_2O_3$, the glass having a mass ratio $(SiO_2+Al_2O_3)/B_2O_3$ in a range of 7-30 and a mass ratio $(SiO_2+Al_2O_3)/RO$ equal to or greater than 6.

Effect of Invention

According to the present invention, a glass having a high strain point can be manufactured while inhibiting or avoiding the erosion/wear of the glass melting furnace, and thus, it is possible to provide, with high productivity, glass substrates for flat panel displays—and particularly for p-Si TFT flat panel displays—composed of a glass that has a high strain point and that can inhibit the heat shrinkage of glass substrates at the time of display manufacture.

EMBODIMENTS OF INVENTION

In the present specification, the composition of glass that constitutes a glass substrate is expressed in percentage by mass, and the ratio between components that constitute a glass is expressed in mass ratio, unless particularly stated otherwise. Further, the "composition and physical properties of a glass substrate" refer to the composition and physical properties of the glass that constitutes the glass substrate unless particularly stated otherwise, and the simple wording "glass" refers to the glass that constitutes the glass substrate. Note, however, that the heat shrinkage rate of a glass substrate refers to a value obtained by measuring, under the conditions described in the Examples, a glass substrate formed according to the predetermined conditions described in the Examples. Further, In the present specification, "low-temperature-viscosity characteristic temperatures" refer to temperatures at which the glass exhibits viscosity in the range of $10^{7.6}$-$10^{14.5}$ dPa·s, and the strain point and Tg are included in the low-temperature-viscosity characteristic temperatures. Thus, "to increase the low-temperature-viscosity characteristic temperature" also means to increase the strain point and Tg, and conversely, "to increase the strain point and/or Tg" means to increase the low-temperature-viscosity characteristic temperature(s). The "melting temperature" which serves as an index of meltability is a temperature at which the glass exhibits a viscosity of $10^{2.5}$ dPa·s, which is a temperature serving as an index of meltability.

Glass Substrate for p-Si TFT Flat Panel Display:

The glass substrate for a p-Si TFT flat panel display of the present invention (the glass substrate according to a first embodiment of the present invention) is a substrate composed of a glass comprising 52-78 mass % of $SiO_2$, 3-25 mass % of $Al_2O_3$, 3-15 mass % of $B_2O_3$, 3-25 mass % of RO, wherein RO is total amount of MgO, CaO, SrO, and BaO, 0.01-1 mass % of $Fe_2O_3$, and 0-0.3 mass % of $Sb_2O_3$, and substantially not comprising $As_2O_3$, the glass having a mass ratio $(SiO_2+Al_2O_3)/B_2O_3$ in a range of 7-30 and a mass ratio $(SiO_2+Al_2O_3)/RO$ equal to or greater than 6. An example of the glass substrate according to the first embodiment of the present invention may include a glass substrate composed of a glass comprising 52-78 mass % of $SiO_2$, 3-25 mass % of $Al_2O_3$, 3-15 mass % of $B_2O_3$, 3-13 mass % of RO, and 0.01-1 mass % of $Fe_2O_3$, and substantially not comprising $Sb_2O_3$ and $As_2O_3$, the glass having a mass ratio $(SiO_2+Al_2O_3)/B_2O_3$ in a range of 8.9-20 and a mass ratio $(SiO_2+Al_2O_3)/RO$ equal to or greater than 7.5. The reasons why the glass substrate according to the first embodiment of the present invention comprises each of the glass components, as well as the ranges of the contents and the composition ratios, will be described below.

The content of $SiO_2$ in the glass substrate according to the first embodiment of the present invention is in a range of 52-78 mass %.

$SiO_2$ is a skeletal component of glass, and is thus an essential component. If the content is low, there are tendencies that acid resistance and resistance to buffered hydrofluoric acid (BHF) will deteriorate, and the strain point will drop. Also, if the $SiO_2$ content is low, the coefficient of thermal expansion tends to increase. Further, if the $SiO_2$ content is too low, it becomes difficult to reduce the density of the glass substrate.

On the other hand, if the $SiO_2$ content is too high, then there are tendencies that the specific resistance of the glass melt will increase, the melting temperature will increase significantly, and melting will become difficult. If the $SiO_2$ content is too high, the devitrification resistance also tends to deteriorate. From this standpoint, the $SiO_2$ content is set in a range of 52-78 mass %. The range of the $SiO_2$ content is preferably 57-75 mass %, more preferably 58-72 mass %, further preferably 59-70 mass %, even more preferably 59-69 mass %, further more preferably 61-69 mass %, further more preferably 61-68 mass %, and further more preferably 62-67 mass %. On the other hand, if the $SiO_2$ content is too high, the glass etching rate tends to become slow. From the standpoint of obtaining a glass substrate with a sufficiently high etching rate, which indicates the speed for slimming a glass plate, the range of the $SiO_2$ content is preferably 53-75 mass %, more preferably 55-70 mass %, further preferably 55-65 mass %, and even more preferably 58-63 mass %. It should be noted that the $SiO_2$ content is determined as appropriate with consideration given to both the aforementioned physical properties, such as acid resistance, and the etching rate.

The content of $Al_2O_3$ in the glass substrate according to the first embodiment of the present invention is in a range of 3-25 mass %.

$Al_2O_3$ is an essential component that inhibits phase separation and increases the strain point. If the content is too low, the glass is prone to phase separation, and also the strain point drops. Further, there are tendencies that the Young's modulus and the etching rate will also be reduced.

If the $Al_2O_3$ content is too high, then the specific resistance will increase. Further, the devitrification temperature of glass will rise and devitrification resistance will deteriorate, and thus, formability tends to deteriorate. From this standpoint, the $Al_2O_3$ content is in a range of 3-25 mass %. The range of the $Al_2O_3$ content is preferably 8-25 mass %, more preferably 10-23 mass %, further preferably 12-21 mass %, even more preferably 12-20 mass % or 14-21 mass %, further more preferably 14-20 mass %, and further more preferably 15-19 mass %. On the other hand, from the standpoint of obtaining a glass substrate with a sufficiently high etching rate, the $Al_2O_3$ content is preferably 8-25 mass %, more preferably 10-23 mass %, further preferably 14-23 mass %, and even more preferably 17-22 mass %. It should be noted that the $Al_2O_3$ content is determined as appropriate with consideration given to both the aforementioned phase separation properties etc. of the glass and the etching rate.

$B_2O_3$ in the glass substrate according to the first embodiment of the present invention is in a range of 3-15 mass %.

$B_2O_3$ is an essential component that reduces temperatures in the high-temperature-viscosity range, typified by the melting temperature of glass, and improves refinability. If the $B_2O_3$ content is too low, meltability, devitrification resistance, and BHF resistance tend to deteriorate. Further, if the $B_2O_3$ content is too low, the specific gravity will increase, and it becomes difficult to reduce density. On the other hand, if the $B_2O_3$ content is too high, the specific resistance will increase. Further, if the $B_2O_3$ content is too high, the strain point will drop, and heat resistance will deteriorate. Also, acid resistance tends to deteriorate, and the Young's modulus tends to decrease. Further, due to the volatilization of $B_2O_3$ at the time of glass melting, the glass becomes significantly nonuniform, and striae are prone to occur. From this standpoint, the $B_2O_3$ content is in a range of 3-15 mass %, and the range thereof is preferably 3-12 mass %, more preferably 3 to less than 11 mass %, more preferably 3 to less than 10 mass %, further preferably 4-9 mass %, even more preferably 5-9 mass %, and further more preferably 7-9 mass %. On the other hand, in order to sufficiently reduce the devitrification temperature, the $B_2O_3$ content is to be in a range of 3-15 mass %, preferably 5-15 mass %, more preferably 6-13 mass %, and even more preferably 7 to less than 11 mass %. It should be noted that the $B_2O_3$ content is determined as appropriate with consideration given to both the aforementioned meltability etc. and the devitrification temperature.

RO, which is the total amount of MgO, CaO, SrO, and BaO, in the glass substrate according to the first embodiment of the present invention is in a range of 3-25 mass %, preferably 3-14 mass %, and more preferably 3-13 mass %.

RO is an essential component that reduces the specific resistance and improves meltability. If the RO content is too low, the specific resistance will increase, and meltability will deteriorate. If the RO content is too high, the strain point will drop, and the Young's modulus will decrease. The density will also increase. Further, if the RO content is too high, the coefficient of thermal expansion tends to increase. From this standpoint, RO is in a range of 3-25 mass %, and the range thereof is preferably 3-14 mass %, more preferably 3-13 mass %, further preferably 6-13 mass %, even more preferably 6-12 mass %, further more preferably 7-12 mass %, and further more preferably 8-11 mass %.

The content of $Fe_2O_3$ in the glass substrate according to the first embodiment of the present invention is in a range of 0.01-1 mass %.

$Fe_2O_3$ functions as a refining agent, and it is also an essential component that reduces the specific resistance of the glass melt. By including the aforementioned predetermined amount of $Fe_2O_3$ in a glass that has a high melting temperature (temperature in the high-temperature-viscosity range) and that is difficult to melt, the specific resistance of the glass melt can be reduced, and glass melting becomes possible while avoiding the occurrence of the problem regarding the erosion/wear of the melting tank at the time of melting through direct electrical heating. However, if the $Fe_2O_3$ content is too high, the glass gets tinted and the transmittance deteriorates. So, the $Fe_2O_3$ content is in a range of 0.01-1 mass %, and the range thereof is preferably 0.01-0.5 mass %, more preferably 0.01-0.4 mass %, further preferably 0.01-0.3 mass %, even more preferably 0.01-0.2 mass %, further more preferably 0.01-0.1 mass %, and further more preferably 0.02-0.07 mass %.

In the glass substrate according to the first embodiment of the present invention, the content of $Sb_2O_3$ is preferably 0-0.3 mass %, and more preferably 0-0.1 mass %, from the standpoint of reducing environmental load. Moreover, from the standpoint of further reducing environmental load, it is more preferable that the glass substrate according to the first embodiment of the present invention substantially does not comprise $Sb_2O_3$ and also substantially does not comprise $As_2O_3$. In the present specification, "substantially not comprising/including" means that substances that become materials of these components are not used in the glass raw materials, but does not exclude the intrusion of components comprised as impurities in the glass raw materials of other components.

In the glass substrate according to the first embodiment of the present invention, the mass ratio $(SiO_2+Al_2O_3)/B_2O_3$, which is the ratio of the total amount of $SiO_2$ and $Al_2O_3$ $(SiO_2+Al_2O_3)$ to $B_2O_3$, serves as an index of the strain point and devitrification resistance. The range of $(SiO_2+Al_2O_3)/B_2O_3$ is preferably 7-30, more preferably 7.5-25, further preferably 8-25, even more preferably 8-23, and further more preferably 8.9-20. The smaller the ratio $(SiO_2+Al_2O_3)/B_2O_3$ is, the lower the strain point becomes, and the strain point will be insufficient when the ratio drops below 7. By setting the ratio preferably equal to equal to or greater than 7.5, more preferably equal to or greater than 8, and further preferably equal to or greater than 8.9, the strain point can be made sufficiently high. Meanwhile, devitrification resistance will deteriorate gradually with the increase in $(SiO_2+Al_2O_3)/B_2O_3$, and will deteriorate excessively when the ratio exceeds 30. A sufficient devitrification resistance can be obtained by setting the ratio to 25 equal to or less than, preferably 23, more preferably equal to or less than 22, and further preferably equal to or less than 20. Thus, the range of $(SiO_2+Al_2O_3)/B_2O_3$ is preferably 8-18, more preferably 9.5-16, further preferably 9.8-14, and even more preferably 10-12. On the other hand, in consideration of obtaining a glass substrate having a sufficiently high etching rate in addition to sufficiently reducing the devitrification temperature, $(SiO_2+Al_2O_3)/B_2O_3$ is preferably 7-30, more preferably 8-25, further preferably 8.2-20, even more preferably 8.4-15, and further more preferably 8.5-12.

In the glass substrate according to the first embodiment of the present invention, the mass ratio $(SiO_2+Al_2O_3)/RO$, which is the ratio of the total amount of $SiO_2$ and $Al_2O_3$ $(SiO_2+Al_2O_3)$ to RO, serves as indices of the strain point and specific resistance. $(SiO_2+Al_2O_3)/RO$ is preferably equal to or greater than 6, more preferably equal to or greater than 7, and further preferably equal to or greater than 7.5. In these ranges, it is possible to achieve both an increase in strain point and a reduction in specific resistance (improvement in meltability). The smaller the ratio $(SiO_2+Al_2O_3)/RO$ is, the lower the strain point becomes, and the strain point will become insufficient when the ratio drops below 6. By setting the ratio to 7 equal to or greater than, preferably 7.5, the strain point can be made sufficiently high. The range of $(SiO_2+Al_2O_3)/RO$ is preferably 7.5-15, more preferably 8.0-12, and further preferably 8.1-10. It should be noted that by setting $(SiO_2+Al_2O_3)/RO$ to equal to or less than 15, the specific resistance can be inhibited from becoming too high. On the other hand, in consideration of obtaining a glass substrate having a sufficiently high etching rate in addition to achieving both an increase in strain point and a reduction in specific resistance, the range of $(SiO_2+Al_2O_3)/RO$ is preferably 6-15, more preferably 7-15, and further preferably 7.5-9.5.

In addition to the above, the glass substrate of the present invention (the glass substrate according to the first embodiment of the present invention) preferably has the following glass composition and/or physical properties.

In the glass substrate according to the first embodiment of the present invention, if $SiO_2+Al_2O_3$, which is the total amount of $SiO_2$ and $Al_2O_3$, is too small, the strain point tends to drop; if it is too large, the specific resistance tends to increase, and devitrification resistance tends to deteriorate. Thus, $SiO_2+Al_2O_3$ is preferably equal to or greater than 75 mass %, more preferably 75-87 mass %, further preferably 75-85 mass %, even more preferably 78-84 mass %, and further more preferably 78-83 mass %. From the standpoint of further increasing the strain point, $SiO_2+Al_2O_3$ is more preferably equal to or greater than 78 mass %, further preferably 79-87 mass %, and even more preferably 80-85 mass %.

In the glass substrate according to the first embodiment of the present invention, MgO is a component that reduces the specific resistance and improves meltability, and among alkaline-earth metals, MgO is a component that is less prone to increase specific gravity, and so by relatively increasing the content thereof, it is possible to facilitate density reduction. MgO is not essential, but by including same, meltability can be improved and the creation of cutting swarf can be inhibited. However, if the MgO content is too high, the devitrification temperature of glass will increase sharply, and thus, formability will deteriorate (and devitrification resistance will deteriorate). Further, if the MgO content is too high, BHF resistance tends to deteriorate, and also acid resistance tends to deteriorate. Particularly in cases where it is desired to reduce the devitrification temperature, it is preferable that MgO is substantially not included. From this standpoint, the MgO content is preferably 0-15 mass %, more preferably 0-10 mass %, further preferably 0-5 mass %, even more preferably 0-4 mass %, further more preferably 0-3 mass %, further more preferably 0 to less than 2, and further more preferably 0-1 mass %, and it is most preferable that MgO is substantially not included.

In the glass substrate according to the first embodiment of the present invention, CaO is a component that reduces the specific resistance and that is also effective in improving the meltability of glass without sharply increasing the devitrification temperature of glass. Further, among alkaline-earth metals, CaO is a component that is less prone to increase specific gravity, and so by relatively increasing the content thereof, it is possible to facilitate density reduction. CaO is not essential, but by including same, it is possible to improve meltability due to a reduction in the specific resistance of the glass melt and a reduction in melting temperature (high-temperature viscosity) and also improve devitrification characteristics, and so, it is preferable to include CaO.

If the CaO content is too high, the strain point tends to drop. Also, the coefficient of thermal expansion tends to increase, and the density tends to increase. The range of CaO content is preferably 0-20 mass %, more preferably 0-15 mass %, further preferably 1-15 mass %, even more preferably 2-15 mass %, further more preferably 3.6-15 mass %, further more preferably 4-14 mass %, further more preferably 5-12 mass %, further more preferably 5-10 mass %, further more preferably greater than 6 to 10 mass %, and most preferably greater than 6 to 9 mass %.

In the glass substrate according to the first embodiment of the present invention, SrO is a component that reduces the specific resistance and improves meltability. SrO is not essential, but by including same, devitrification resistance and meltability are improved. If the SrO content is too high, the density will increase. The range of SrO content is 0-15 mass %, more preferably 0-10 mass %, further preferably 0-9 mass %, even more preferably 0-8 mass %, further more preferably 0-3 mass %, further more preferably 0-2 mass %, further more preferably 0-1 mass %, and even more preferably 0-0.5 mass %. In cases where it is desired to reduce the glass density, it is preferable that SrO is substantially not included.

In the glass substrate according to the first embodiment of the present invention, BaO is a component that reduces the specific resistance and improves meltability. BaO is not essential, but by including same, devitrification resistance and meltability are improved. By including BaO, however, the coefficient of thermal expansion and the density will increase. The BaO content is preferably 0-3 mass %, more preferably 0 to less than 1.5 mass %, further preferably 0-1 mass %, even more preferably 0 to less than 0.5 mass %, and further more preferably 0 to less than 0.1 mass %. In terms of problems concerning environmental load, it is preferable that BaO is substantially not included.

In the glass substrate according to the first embodiment of the present invention, SrO and BaO are components that reduce the specific resistance and improve meltability. They are not essential, but by including same, devitrification resistance and meltability are improved. However, if the content is too high, the density will increase. From the standpoint of achieving density reduction and weight reduction, the range of SrO+BaO, which is the total amount of SrO and BaO, is 0-15 mass %, preferably 0-10 mass %, more preferably 0-9 mass %, further preferably 0-8 mass %, even more preferably 0-3 mass %, further more preferably 0-2 mass %, further more preferably 0-1 mass %, further more preferably 0-0.5 mass %, and even more preferably 0 to less than 0.1 mass %. In cases where it is desired to reduce the density of the glass substrate, it is preferable that SrO and BaO are substantially not included.

In the glass substrate according to the first embodiment of the present invention, $R_2O$, which is total amount of $Li_2O$, $Na_2O$, and $K_2O$, is a component that increases the basicity of glass, facilitates the oxidation of refining agents, and achieves refining.

Further, $R_2O$ is a component that reduces the specific resistance and improves meltability. $R_2O$ is not essential, but the inclusion of $R_2O$ reduces the specific resistance and improves meltability. Further, the basicity of the glass is increased, and refinability is improved.

However, if the $R_2O$ content is too high, the component may elute from the glass substrate and impair TFT properties. Further, the coefficient of thermal expansion tends to increase.

The range of $Li_2O+Na_2O+K_2O$, which is the total amount of $R_2O$, is preferably 0-0.8 mass %, more preferably 0-0.5 mass %, more preferably 0-0.4 mass %, further preferably 0-0.3 mass %, even more preferably 0.01-0.8 mass %, even more preferably 0.01-0.3 mass %, and further more preferably 0.1-0.3 mass %.

Further, for cases where it is desired to reduce the glass's specific resistance reliably, the range of $R_2O$ is preferably 0.1-0.8 mass %, more preferably 0.1-0.6 mass %, more preferably greater than 0.2 to 0.6 mass %, and further preferably greater than 0.2 to 0.5 mass %.

$Li_2O$ and $Na_2O$ are components that reduce the specific resistance and improve meltability, but are components that may impair TFT properties by eluting from the glass substrate, and that may increase the coefficient of thermal expansion of the glass and damage the substrate at the time of heat treatment. The total amount of $Li_2O$ and $Na_2O$ is preferably 0-0.2 mass %, more preferably 0-0.1 mass %, and further preferably 0-0.05 mass %, and it is even more preferable that they are substantially not included.

$K_2O$ is a component that improves the basicity of glass, facilitates the oxidation of refining agents, and achieves refining. It is also a component that reduces the specific resistance and improves meltability. $K_2O$ is not essential, but the inclusion thereof reduces the specific resistance and improves meltability. It also improves refinability.

However, if the $K_2O$ content is too high, there is a tendency that the component will elute from the glass substrate and impair TFT properties. Further, the coefficient of thermal expansion tends to increase. The range of $K_2O$ content is preferably 0-0.8 mass %, more preferably 0-0.5 mass %, further preferably 0-0.3 mass %, and even more preferably 0.1-0.3 mass %.

$K_2O$ has a larger molecular weight than $Li_2O$ and $Na_2O$, and is thus less prone to elute from the glass substrate. Thus, in cases of including $R_2O$, it is preferable to include $K_2O$. That is, it is preferable to include a higher rate of $K_2O$ than $Li_2O$ (satisfying $K_2O>Li_2O$), and preferable to include a higher rate of $K_2O$ than $Na_2O$ (satisfying $K_2O>Na_2O$).

If the ratio of $Li_2O$ and $Na_2O$ is high, there is a stronger tendency that these components will elute from the glass substrate and impair TFT properties. The range of the mass ratio $K_2O/R_2O$ is preferably 0.5-1, more preferably 0.6-1, further preferably 0.7-1, even more preferably 0.75-1, further more preferably 0.8-1, further more preferably 0.9-1, further more preferably 0.95-1, and further more preferably 0.99-1.

In the glass substrate according to the first embodiment of the present invention, $ZrO_2$ and $TiO_2$ are components that improve the chemical resistance and heat resistance of glass. $ZrO_2$ and $TiO_2$ are not essential components, but the inclusion thereof can increase low-temperature-viscosity characteristic temperatures (including Tg and the strain point) and improve acid resistance. However, if the amount of $ZrO_2$ and $TiO_2$ is too large, the devitrification temperature will increase sharply, and thus, devitrification resistance and formability may deteriorate. Particularly, $ZrO_2$ may cause the depositing of $ZrO_2$ crystals during the course of cooling, and this may become an inclusion and impair the quality of glass. For these reasons, in the glass substrate of the present invention, the content by percentage of each of $ZrO_2$ and $TiO_2$ is preferably equal to or less than 5 mass %, more preferably equal to or less than 3 mass %, even more preferably equal to or less than 2 mass %, further more preferably equal to or less than 1 mass %, further more preferably less than 0.5 mass %, and further more preferably less than 0.2 mass %. It is even more preferable that the glass substrate of the present invention substantially does not comprise $ZrO_2$ and $TiO_2$. Stated differently, the content by percentage of each of $ZrO_2$ and $TiO_2$ is preferably 0-5 mass %, more preferably 0-3 mass %, even more preferably 0-2 mass %, further more preferably 0-1 mass %, further more preferably 0 to less than 0.5 mass %, and further more preferably 0 to less than 0.2 mass %. It is even more preferable that the glass substrate of the present invention substantially does not comprise $ZrO_2$ and $TiO_2$.

In the glass substrate according to the first embodiment of the present invention, ZnO is a component that improves BHF resistance and meltability, but is not essential.

If the ZnO content is too high, the devitrification temperature and density tend to increase. Further, the strain point tends to decrease. Thus, the range of ZnO content is preferably 0-5 mass %, more preferably 0-3 mass %, further preferably 0-2 mass %, and even more preferably 0-1 mass %. It is preferable that ZnO is substantially not included.

In the glass substrate according to the first embodiment of the present invention, $RO+ZnO+B_2O_3$, which is the total amount of RO, ZnO, and $B_2O_3$, serves as an index of refinability. If $RO+ZnO+B_2O_3$ is too small, the melting temperature (high-temperature viscosity) of glass will increase, and refinability will deteriorate. On the other hand, if the amount is too large, the strain point will drop. The range of $RO+ZnO+B_2O_3$ is preferably less than 20 mass %, more preferably 5 to less than 20 mass %, further preferably 7 to less than 20 mass %, even more preferably 10 to less than 20 mass %, further more preferably 14 to less than 20 mass %, and further more preferably 15-19 mass %. On the other hand, in order to reduce the devitrification temperature sufficiently, the range of $RO+ZnO+B_2O_3$ is preferably less than 30 mass %, more preferably 10 to less than 30 mass %, further preferably 14 to less than 30 mass %, even more preferably 14 to less than 25 mass %, and further more preferably 15-23 mass %. It should be noted that $RO+ZnO+B_2O_3$ is determined as appropriate with consideration given to both refinability etc. and the devitrification temperature.

In the glass substrate according to the first embodiment of the present invention, $P_2O_5$ is a component that reduces the melting temperature (high-temperature viscosity) and improves meltability, but is not essential. If the $P_2O_5$ content is too high, then due to the volatilization of $P_2O_5$ at the time of glass melting, the glass becomes significantly nonuniform, and striae are prone to occur. Also, acid resistance deteriorates significantly, and opacification is prone to occur. The range of $P_2O_5$ content is preferably 0-3 mass %, more preferably 0-1 mass %, and further preferably 0-0.5 mass %, and it is particularly preferable that $P_2O_5$ is substantially not included.

In the glass substrate according to the first embodiment of the present invention, $B_2O_3+P_2O_5$, which is the total amount of $B_2O_3$ and $P_2O_5$, serves as an index of meltability. If $B_2O_3+P_2O_5$ is too small, meltability tends to deteriorate. If it is too large, then due to the volatilization of $B_2O_3$ and $P_2O_5$ at the time of glass melting, the glass becomes significantly non-uniform, and striae are prone to occur. Further, the strain point tends to drop. The range of $B_2O_3+P_2O_5$ is preferably 3-15 mass %, more preferably 3 to less than 11 mass %, further preferably 5 to less than 10 mass %, even more preferably 4-9 mass %, further more preferably 5-9 mass %, and further more preferably 7-9 mass %. On the other hand, in order to reduce the devitrification temperature sufficiently, the range of $B_2O_3+P_2O_5$ is preferably 3-15 mass %, preferably 5-15 mass %, more preferably 6-13 mass %, and even more preferably 7 to less than 11 mass %. It should be noted that $B_2O_3+P_2O_5$ is determined as appropriate with consideration given to both meltability etc. and the devitrification temperature.

In the glass substrate according to the first embodiment of the present invention, CaO/RO serves as an index of meltability and devitrification resistance. The range of CaO/RO is preferably 0.05-1, more preferably 0.1-1, further preferably 0.5-1, even more preferably 0.65-1, further more preferably 0.7-1, further more preferably 0.85-1, further more preferably 0.9-1, and even more preferably 0.95-1. Both devitrification resistance and meltability can be achieved within the aforementioned ranges. A reduction in density can also be achieved. Further, rather than including a plurality of alkaline-earth metals as raw materials, the inclusion of only CaO is more effective in increasing the strain point. In cases of including, as a raw material, only CaO as an alkaline-earth metal oxide, the CaO/RO value of the obtained glass will be around 0.98-1, for example. It should be noted that, even in cases of including, as a raw material, only CaO as an alkaline-earth metal oxide, the obtained glass may comprise other alkaline-earth metal oxides as impurities.

In the glass substrate according to the first embodiment of the present invention, it is preferable to set the value $SiO_2$-½$Al_2O_3$, which is the difference found by subtracting half the $Al_2O_3$ content from the $SiO_2$ content, to equal to or less than 60 mass %, because it is possible to obtain a glass substrate having a sufficient etching rate for performing slimming of the glass. It should be noted that, if the $SiO_2$-½$Al_2O_3$ value is made too small to increase the etching rate, the devitrification temperature tends to increase. Further, there are cases where the strain point cannot be made sufficiently high. Thus, the $SiO_2$-½$Al_2O_3$ value is preferably equal to or greater than 40 mass %. From the above, the $SiO_2$-½$Al_2O_3$ value is preferably 40-60 mass %, more preferably 45-60 mass %, even more preferably 45-58 mass %, further more preferably 45-57 mass %, further more preferably 45-55 mass %, and further more preferably 49-54 mass %.

Furthermore, in order to perform etching (slimming) with high productivity, the glass that constitutes the glass substrate according to the first embodiment of the present invention preferably has an etching rate of 50 μm/h or higher. On the other hand, if the etching rate is excessively high, inconveniences may arise in the reaction with chemical solutions during the panel production step. Thus, the etching rate of the glass that constitutes the glass substrate is preferably 160 μm/h or lower. The etching rate is preferably 55-140 μm/h, more preferably 60-140 μm/h, further preferably 60-120 μm/h, and even more preferably 70-120 μm/h. In the present invention, the etching rate is defined as a value measured according to the following condition.

The etching rate (μm/h) is expressed as the amount of reduction in thickness (μm) on one surface of the glass substrate per unit time (1 hour) when the glass substrate is immersed for 1 hour in a 40° C. etching solution consisting of a mixed acid having an HF proportion of 1 mol/kg and an HCl proportion of 5 mol/kg.

The glass constituting the glass substrate according to the first embodiment of the present invention may contain a refining agent. The refining agent is not particularly limited as far as it places a small load on the environment and is excellent in refining the glass. Examples may include at least one type of agent selected from the group consisting of metal oxides of Sn, Fe, Ce, Tb, Mo, and W. $SnO_2$ is suitable as a refining agent. If the amount of refining agent added is too small, the quality of bubbles deteriorates. If the content is too large, this may become a cause of devitrification and/or tinting. The amount of refining agent to be added depends on the type of refining agent and the glass composition, but, for example, a range of 0.05-1 mass %, preferably 0.05-0.5 mass %, and more preferably 0.1-0.4 mass %, is suitable. It should be noted that $Fe_2O_3$, which is an essential component in the present invention, may be used as a refining agent, and it is preferable to use $Fe_2O_3$ in combination with $SnO_2$, and not singly, and $Fe_2O_3$ can be used to support the refining effect of $SnO_2$.

It is preferable that the glass constituting the glass substrate according to the first embodiment of the present invention substantially does not comprise PbO and F. It is preferable not to include PbO and F for environmental reasons.

In the glass constituting the glass substrate according to the first embodiment of the present invention, it is preferable to use a metal oxide as a refining agent. In order to improve the refinability of the metal oxide, it is preferable to render the glass oxidative. However, the use of reducing materials (e.g., ammonium salts and chlorides) deteriorates the refinability of the metal oxide. Because $NH_4^+$ and Cl remain in the glass by using such reducing materials, the $NH_4^+$ content is preferably less than $4\times10^{-4}$% and more preferably 0 to less than $2\times10^{-4}$%, and it is further preferable that $NH_4^+$ is substantially not included. Furthermore, in the glass of the present invention, the Cl content is preferably less than 0.1%, more preferably 0 to less than 0.1%, further preferably 0 to less than 0.05%, and even more preferably 0 to less than 0.01%, and it is further preferable that Cl is substantially not included. It should be noted that $NH_4^+$ and Cl are components that remain in the glass by being used in glass raw materials in the form of ammonium salts and chlorides (particularly ammonium chloride) in the hope of obtaining refining effects, but the use of such materials is not preferable, because of environmental concerns and because they cause corrosion of facilities.

If the low-temperature-viscosity characteristic temperatures, typified by the strain point and Tg, of the glass substrate are low, heat shrinkage during the heat treatment step (at the time of display manufacture) becomes large. The strain point [° C.] of the glass constituting the glass substrate according to the first embodiment of the present invention is 665° C. or higher, and preferably 675° C. or higher. Further, the strain point [° C.] is preferably 680° C. or higher, more preferably 685° C. or higher, further preferably 688° C. or higher, even more preferably 690° C. or higher, further more preferably 695° C. or higher, and further more preferably 700° C. or higher. There is no upper limit to the strain point [° C.] of the glass of the present invention from the standpoint of lowtemperature-viscosity characteristics, but as a practical guide, the upper limit is, for example, 750° C. or lower, preferably 745° C. or lower, and more preferably 740° C. or lower. However, the upper limit is not limited to the above. The strain point of the glass can be set to a desired value by adjusting the glass composition with reference to the above description on the glass composition of the glass substrate of the present invention.

Furthermore, the Tg [° C.] of the glass constituting the glass substrate according to the first embodiment of the present invention is preferably 720° C. or higher, more preferably 730° C. or higher, further preferably 740° C. or higher, further preferably 745° C. or higher, and even more preferably 750° C. or higher. As the Tg becomes lower, heat resistance tends to deteriorate. Further, heat shrinkage in the glass substrate is more likely to occur during the heat treatment step at the time of display manufacture. There is no upper limit to the Tg [° C.] of the glass of the present invention from the standpoint of heat resistance and heat shrinkage, but as a practical guide, the upper limit is, for example, 800° C. or lower, preferably 795° C. or lower, and more preferably 790° C. or lower. However, the upper limit is not limited to the above. To bring the Tg of the glass within the aforementioned range, it is suitable to increase the Tg by, for example, increasing components such as $SiO_2$ and $Al_2O_3$ in a range of composition of the glass substrate of the present invention.

The density [g/cm$^3$] of the glass constituting the glass substrate according to the first embodiment of the present invention is preferably equal to or less than 2.5 g/cm$^3$, more preferably equal to or less than 2.45 g/cm$^3$, further preferably equal to or less than 2.42 g/cm$^3$, and even more preferably equal to or less than 2.4 g/cm$^3$, from the standpoint of reducing the weight of the glass substrate and the weight of the display. If the density is too high, it becomes difficult to reduce the weight of the glass substrate, and thus difficult to reduce the weight of the display.

The viscosity of the glass constituting the glass substrate according to the first embodiment of the present invention changes depending on the conditions at the time of glass melting. Even with glass of the same composition, the water content in the glass differs depending on the difference in conditions for melting, and thus the strain point may fluctuate in a range of around 1-10° C., for example. Accordingly, in order to obtain a glass having a desired strain point, it is necessary to adjust the glass composition and also adjust the water content in the glass at the time of glass melting.

The β-OH value, which is an index of the water content in the glass, can be adjusted through the selection of raw materials. For example, the β-OH value can be increased by selecting raw materials with a high water content (e.g., hydroxide materials), or by adjusting the contents of materials, such as chlorides, that reduce the amount of water in the glass. The β-OH value can also be adjusted by adjusting the ratio between direct electrical heating and gas combustion heating (oxygen combustion heating) employed in glass melting. Moreover, the β-OH value can be increased by increasing the amount of water in the atmosphere inside the furnace, or by bubbling the molten glass with water vapor at the time of melting.

It should be noted that the β-OH value [mm$^{-1}$] of the glass can be found by the following equation in the infrared absorption spectrum of glass.

$$\beta\text{-OH value}=(1/X)\log 10(T1/T2)$$

X: Glass thickness (mm)
T1: Transmittance at reference wavelength 2600 nm (%)
T2: Minimum transmittance near 2800 nm, the hydroxyl group's absorption wavelength (%)

As regards the β-OH value, which is an index of the amount of water in the glass, a smaller value tends to increase the strain point and reduce heat shrinkage during the heat treatment step (at the time of display manufacture). On the other hand, a larger β-OH value tends to reduce the melting temperature (high-temperature viscosity).

To achieve both meltability and low shrinkage rate, the β-OH value of the glass constituting the glass substrate according to the first embodiment of the present invention is preferably 0.05-0.40 mm$^{-1}$, more preferably 0.10-0.35 mm$^{-1}$, further preferably 0.10-0.30 mm$^{-1}$, even more preferably 0.10-0.25 mm$^{-1}$, further more preferably 0.10-0.20 mm$^{-1}$, and further more preferably 0.10-0.15 mm$^{-1}$.

The devitrification temperature [° C.] of the glass constituting the glass substrate according to the first embodiment of the present invention is preferably lower than 1330° C., more preferably lower than 1300° C., further preferably 1250° C. or lower, even more preferably 1230° C. or lower, further more preferably 1220° C. or lower, and further more preferably 1210° C. or lower. If the devitrification temperature is below 1300° C., glass plates can be formed with ease by float processing. If the devitrification temperature is 1250° C. or lower, glass plates can be formed with ease by down-draw processing. By employing down-draw processing, the surface quality of glass substrates can be improved and production costs can be reduced. If the devitrification temperature is too high, then devitrification is prone to occur, and devitrification resistance deteriorates. Also, the glass will become inapplicable to down-draw processing. On the other hand, in consideration of properties of the flat-panel-display substrate, such as the heat shrinkage rate and density, the devitrification temperature of the glass constituting the glass substrate according to the first embodiment of the present invention is preferably 1050° C. to below 1300° C., more preferably 1110-1250° C., further preferably 1150-1230° C., even more preferably 1160-1220° C., and further more preferably 1170-1210° C.

The coefficient of thermal expansion (100-300° C.) [×10$^{-7}$° C.] of the glass constituting the glass substrate according to the first embodiment of the present invention is preferably less than 39×10$^{-7}$° C., more preferably less than 38×10$^{-7}$° C., further preferably less than 37×10$^{-7}$° C., even more preferably 28 to less than 36×10$^{-7}$° C., further more preferably 30 to less than 35×10$^{-7}$° C., further more preferably 31-34.5×10$^{-7}$° C., and further more preferably 32-34×10$^{-7}$° C. If the coefficient of thermal expansion is large, thermal impact and the amount of heat shrinkage tend to increase in the heat treatment step at the time of display manufacture. On the other hand, if the coefficient of thermal expansion is small, the coefficient of thermal expansion becomes less compatible with that of other peripheral materials, such as metals and organic adhesives, formed on the glass substrate, and the peripheral parts may peel off. Further, in the display manufacturing step, rapid heating and rapid cooling are repeated, and the thermal impact on the glass substrate becomes large. Moreover, with large-sized glass substrates, a difference in temperature (temperature distribution) tends to occur in the heat treatment step, and the possibility of glass substrate breakage increases. By setting the coefficient of thermal expansion within the aforementioned range, thermal stress caused by the difference in thermal expansion can be reduced, and as a result, the possibility of glass substrate breakage is reduced in the heat treatment step. In other words, setting the coefficient of thermal expansion within the aforementioned range is particularly effective from the standpoint of reducing the possibility of glass substrate breakage for a glass substrate that is 2000 to 3500 mm in the width direction and 2000 to 3500 mm in the longitudinal direction. It should be noted that, from the standpoint of placing importance on making the coefficient of thermal expansion compatible with that of peripheral materials, such as metals and organic adhesives, formed on the glass substrate, the coefficient of thermal expansion (100-300° C.) is preferably less than $40\times10^{-7}$° C., more preferably 28 to less than $40\times10^{-7}$° C., further preferably 30 to less than $39\times10^{-7}$° C., even more preferably 32 to less than $38\times10^{-7}$° C., and further more preferably 34 to less than $38\times10^{-7}$° C.

The heat shrinkage rate [ppm] of the glass substrate according to the first embodiment of the present invention is preferably equal to or less than 75 ppm, and preferably equal to or less than 65 ppm. Furthermore, the heat shrinkage rate is preferably equal to or less than 60 ppm, more preferably equal to or less than 55 ppm, further preferably equal to or less than 50 ppm, even more preferably equal to or less than 48 ppm equal to or less than, and further more preferably equal to or less than 45 ppm. More specifically, the heat shrinkage rate is preferably 0-75 ppm, more preferably 0-65 ppm, further preferably 0-60 ppm, even more preferably 0-55 ppm, further more preferably 0-50 ppm, and further more preferably 0-45 ppm. If the heat shrinkage rate (amount) is large, the pixel pitch will become significantly uneven, and it becomes impossible to achieve a high-definition display. In order to control the heat shrinkage rate (amount) to be within the predetermined range, it is preferable to set the strain point of the glass to 680° C. or higher. The heat shrinkage rate (amount) is most preferably 0 ppm, but in order to reduce the heat shrinkage rate to 0 ppm, it becomes necessary to make the annealing step extremely long or perform a heat shrinkage reduction process (offline annealing) after the annealing step. This reduces productivity and sharply increases costs. In view of productivity and costs, the heat shrinkage rate is, for example, preferably 3-75 ppm, more preferably 5-75 ppm, further preferably 5-65 ppm, even more preferably 5-60 ppm, further more preferably 8-55 ppm, further more preferably 8-50 ppm, and further more preferably 15-45 ppm.

It should be noted that the heat shrinkage rate is expressed by the following equation after performing a heat treatment in which the temperature is raised and lowered at a rate of 10° C./min and is kept at 550° C. for 2 hours:

Heat shrinkage rate (ppm)={Amount of shrinkage of glass before and after heat treatment/Length of glass before heat treatment}$\times 10^6$.

The heat shrinkage rate of the glass substrate according to the first embodiment of the present invention is measured after conducting the aforementioned heat treatment with respect to the glass substrate, which is the target for which the heat shrinkage rate is to be measured. Alternatively, however, the heat shrinkage rate of the glass substrate according to the first embodiment of the present invention may be a value obtained by conducting the aforementioned heat treatment after subjecting the glass substrate, which is the target for which the heat shrinkage rate is to be measured, to an annealing process of keeping the glass substrate at Tg for 30 minutes, cooling same to 100° C. below Tg at a rate of 100° C./min, and then leaving the glass substrate to cool to room temperature, as described in the section on the preparation of a sample glass substrate for heat shrinkage measurement in the Examples. Cooling conditions may differ among glass substrates manufactured according to continuous methods such as down-draw processing; by measuring the heat shrinkage rate after performing the cooling process after keeping the temperature at Tg, heat shrinkage rate values can be obtained under the same conditions.

The glass substrate according to the first embodiment of the present invention encompasses a glass substrate for a p-Si TFT flat panel display (glass substrate according to a second embodiment of the present invention), the glass substrate having a heat shrinkage rate of equal to or less than 75 ppm, preferably equal to or less than 65 ppm and more preferably equal to or less than 60 ppm, and being composed of a glass comprising 52-78 mass % of $SiO_2$, 3-25 mass % of $Al_2O_3$, 3-15 mass % of $B_2O_3$, 3-25 mass % and more preferably 3-13 mass % of RO, wherein RO is total amount of MgO, CaO, SrO, and BaO, and 0.01-1 mass % of $Fe_2O_3$, and substantially not comprising $Sb_2O_3$ and $As_2O_3$. The heat shrinkage rate of the glass substrate is equal to or less than 75 ppm, and preferably equal to or less than 65 ppm. Moreover, the heat shrinkage rate is preferably equal to or less than 60 ppm, more preferably equal to or less than 55 ppm, further preferably equal to or less than 50 ppm, even more preferably equal to or less than 48 ppm, further more preferably equal to or less than 45 ppm, and further more preferably equal to or less than 40 ppm. The $Fe_2O_3$ content is 0.01-1 mass %, but the range thereof is preferably 0.01-0.5 mass %, more preferably 0.01-0.2 mass %, further preferably 0.01-0.1 mass %, and even more preferably 0.02-0.07 mass %.

The glass substrate according to the second embodiment of the present invention is composed of a glass that substantially does not comprise $Sb_2O_3$ and also substantially does not comprise $As_2O_3$ in terms of problems concerning environmental load.

The glass substrate for p-Si TFT flat panel displays according to the second embodiment of the present invention, which has a heat shrinkage rate of equal to or less than 75 ppm—preferably equal to or less than 65 ppm, and more preferably equal to or less than 60 ppm—and is composed of a glass comprising 0.01-1 mass % of $Fe_2O_3$, can reduce the specific resistance of the molten glass without causing critical unevenness in pixel pitch, and can avoid the occurrence of the problem regarding the erosion/wear of the melting tank at the time of melting through direct electrical heating. The glass composition, physical properties, etc. of the glass substrate according to the second embodiment of the present invention, except for those mentioned above, may be the same as those for the glass substrate according to the first embodiment of the present invention.

The glasses that constitute the glass substrates according to the first and second embodiments of the present invention have a melting temperature of preferably 1680° C. or lower, more preferably 1650° C. or lower, further preferably 1640° C. or lower, and even more preferably 1620° C. or lower. If the melting temperature is high, the load on the melting tank becomes large. Also, costs will increase because a large amount of energy will be used. In order to bring the melting temperature within the aforementioned range, it is suitable to include components that reduce viscosity, such as $B_2O_3$ and RO, in a range of the composition of the glass substrate of the present invention.

The glasses that constitute the glass substrates according to the first and second embodiments of the present invention have a liquid-phase viscosity (viscosity at the devitrification temperature) in a range of $10^{4.0}$ or greater, preferably $10^{4.5}$-$10^{6.0}$ dPa·s, more preferably $10^{4.5}$-$10^{5.9}$ dPa·s, further preferably $10^{4.6}$-$10^{5.8}$ dPa·s, even more preferably $10^{4.8}$-$10^{5.7}$ dPa·s, further more preferably $10^{4.8}$-$10^{5.6}$ dPa·s, and further more preferably $10^{4.9}$-$10^{5.5}$. In these ranges, the glass substrate will have the necessary properties for a glass substrate for a p-Si TFT flat panel display, and crystals causing devitrification are less prone to occur at the time of forming, and glass substrates become easier to form through overflow down-draw processing. Thus, the surface quality of glass substrates can be improved, and the costs for producing glass substrates can be reduced. By appropriately adjusting the contents of the components within the respective ranges of the compositions of the glasses constituting the glass substrates of the first and second embodiments of the present invention, the liquid-phase viscosity of the glasses can be brought within the aforementioned ranges.

As regards the respective glasses that constitute the glass substrates according to the first and second embodiments of the present invention, the specific resistance (at 1550° C.) [$\Omega \cdot cm$] of the glass melt is preferably 50-300 $\Omega \cdot cm$, more preferably 50-250 $\Omega \cdot cm$, further preferably 50-200 $\Omega \cdot cm$, and even more preferably 100-200 $\Omega \cdot cm$. If the specific resistance is too small, the current value necessary for melting becomes too large, and this may give rise to constraints in terms of facility. On the other hand, if the specific resistance is too large, the exhaustion of electrodes tends to increase. There are also cases where a current passes through the refractory brick constituting the melting tank—and not through the glass—and this may subject the melting tank to erosion and wear. The specific resistance of the molten glass can be adjusted to fall within the aforementioned range mainly by controlling the contents of RO and $Fe_2O_3$, which are essential components of the glass of the present invention.

The Young's modulus [GPa] of the glass substrates according to the first and second embodiments of the present invention is preferably equal to or greater than 70 GPa, more preferably equal to or greater than 73 GPa, further preferably equal to or greater than 74 GPa, and even more preferably equal to or greater than 75 GPa If the Young's modulus is small, the glass becomes prone to breakage as a result of the flexure of the glass due to the glass's own weight. Particularly, in large-sized glass substrates that are equal to or greater than 2000 mm in the width direction, the problem concerning breakage due to flexure becomes noticeable. The Young's modulus of the glass substrate can be increased by adjusting the content of a component that has a strong tendency to change the Young's modulus, such as $Al_2O_3$, in a range of the composition of the glass substrate of the present invention.

The specific elastic modulus (Young's modulus/density) [$GPa \, cm^3 g^{-1}$] of the glass substrates according to the first and second embodiments of the present invention is preferably equal to or greater than 28 $GPa \, cm^3 g^{-1}$, more preferably equal to or greater than 29 $GPa \, cm^3 g^{-1}$, further preferably equal to or greater than 30 $GPa \, cm^3 g^{-1}$, and even more preferably equal to or greater than 31 $GPa \, cm^3 g^{-1}$. If the specific elastic modulus is small, the glass becomes prone to breakage as a result of the flexure of the glass due to the glass's own weight. Particularly, in large-sized glass substrates that are equal to or greater than 2000 mm in the width direction, the problem concerning breakage due to flexure becomes noticeable.

There is no particular limitation to the size of the glass substrates according to the first and second embodiments of the present invention. The size in the width direction is, for example, 500-3500 mm, preferably 1000-3500 mm, and more preferably 2000-3500 mm. The size in the longitudinal direction is, for example, 500-3500 mm, preferably 1000-3500 mm, and more preferably 2000-3500 mm. The use of larger glass substrates improves the productivity of liquid crystal displays or organic EL displays.

The thickness [mm] of the glass substrates according to the first and second embodiments of the present invention may be in the range of 0.1-1.1 mm, for example. However, the thickness is not limited to this range. For example, the thickness [mm] may be in a range of 0.1-0.7 mm, 0.3-0.7 mm, or 0.3-0.5 mm. If the glass plate is too thin, the strength of the glass substrate itself will be reduced, and for example, breakage is prone to occur at the time of manufacturing flat panel displays. If the substrate is too thick, it will not be preferable for displays that call for thickness reduction, and the weight of the glass substrate will become heavy, making it difficult to reduce the weight of flat panel displays.

The present invention encompasses a glass substrate for a p-Si TFT flat panel display (glass substrate according to a third embodiment of the present invention), the glass substrate being composed of a glass comprising 57-75 mass % of $SiO_2$, 8-25 mass % of $Al_2O_3$, 3-15 mass % of $B_2O_3$, 3-25 mass % of RO, wherein RO is total amount of MgO, CaO, SrO, and BaO, 0-15 mass % of MgO, 0-20 mass % of CaO, 0-3 mass % of a total amount of SrO and BaO, 0.01-1 mass % of $Fe_2O_3$, and 0-0.3 mass % of $Sb_2O_3$, the glass substantially not comprising $As_2O_3$.

An example of the glass substrate according to the third embodiment of the present invention may include a glass substrate for a p-Si TFT flat panel display, the glass substrate being composed of a glass comprising 57-75 mass % of $SiO_2$,
8-25 mass % of $Al_2O_3$,
3 to less than 10 mass % of $B_2O_3$,
3-25 mass % of RO, wherein RO is total amount of MgO, CaO, SrO, and BaO,
0-15 mass % of MgO,
0-20 mass % of CaO,
0-30 mass % of a total amount of SrO and BaO, and
0.01-1 mass % of $Fe_2O_3$,
the glass substantially not comprising $Sb_2O_3$ and $As_2O_3$.

The reasons why the glass substrate according to the third embodiment of the present invention comprises each of the components, as well as the ranges of the contents and the composition ratios, will be described below.

The content of $SiO_2$ in the glass substrate according to the third embodiment of the present invention is in a range of 57-75 mass %.

$SiO_2$ is a skeletal component of glass, and is thus an essential component. If the content is low, there are tendencies that acid resistance and resistance to buffered hydrofluoric acid (BHF) will deteriorate, and the strain point will drop. Also, the coefficient of thermal expansion tends to increase. Further, if the $SiO_2$ content is too low, it becomes difficult to reduce the density of the glass substrate. On the other hand, if the $SiO_2$ content is too high, then there are tendencies that the specific resistance of the glass melt will increase, the melting temperature will increase significantly, and melting will become difficult. If the $SiO_2$ content is too high, the devitrification resistance also tends to deteriorate. From this standpoint, the $SiO_2$ content is set in a range of 57-75 mass %. The range of the $SiO_2$ content is preferably 58-72 mass %, more preferably 59-70 mass %, further preferably 61-69 mass %, and even more preferably 62-67 mass %. On the other hand, if the $SiO_2$ content is too high, the glass etching rate tends to become slow. From the standpoint of obtaining a glass substrate with a sufficiently high etching rate, which indicates the speed for slimming the glass plate, the range of the $SiO_2$ content is preferably 57-75 mass %, more preferably 57-70 mass %, further preferably 57-65 mass %, and even more preferably 58-63 mass %. It should be noted that the $SiO_2$ content is determined as appropriate with consideration given to both the aforementioned physical properties, such as acid resistance, and the etching rate.

The content of $Al_2O_3$ in the glass substrate according to the third embodiment of the present invention is in a range of 8-25 mass %.

$Al_2O_3$ is an essential component that inhibits phase separation and increases the strain point. If the content is too low, the glass is prone to phase separation, and the strain point tends to drop. Further, there are tendencies that the Young's modulus and the etching rate will also be reduced. If the $Al_2O_3$ content is too high, then the specific resistance will increase. Further, the devitrification temperature of glass will rise and devitrification resistance will deteriorate, and thus, formability tends to deteriorate. From this standpoint, the $Al_2O_3$ content is in a range of 8-25 mass %. The range of the $Al_2O_3$ content is preferably 10-23 mass %, more preferably 12-21 mass %, further preferably 12-20 mass %, even more preferably 14-20 mass %, and further more preferably 15-19 mass %. On the other hand, from the standpoint of obtaining a glass substrate with a sufficiently high etching rate, the $Al_2O_3$ content is preferably 10-23 mass %, more preferably 12-23 mass %, further preferably 14-23 mass %, and even more preferably 17-22 mass %. It should be noted that the $Al_2O_3$ content is determined as appropriate with consideration given to both the aforementioned phase separation properties etc. of the glass and the etching rate.

$B_2O_3$ in the glass substrate according to the third embodiment of the present invention is in a range of 3-15 mass %, and more preferably 3-10 mass %.

$B_2O_3$ is an essential component that reduces the viscosity of glass, and improves meltability and refinability. If the $B_2O_3$ content is too low, meltability, devitrification resistance, and also BHF resistance will deteriorate. Further, if the $B_2O_3$ content is too low, the specific gravity will increase, and it becomes difficult to reduce density. If the $B_2O_3$ content is too high, the specific resistance of the glass melt will increase. Further, if the $B_2O_3$ content is too high, the strain point will drop, and heat resistance will deteriorate. Furthermore, acid resistance will deteriorate, and the Young's modulus will decrease. Further, due to the volatilization of $B_2O_3$ at the time of glass melting, the glass becomes significantly nonuniform, and striae are prone to occur. From this standpoint, the $B_2O_3$ content is in a range of 3-15 mass %, preferably 3 to less than 10 mass %, more preferably 4-9 mass %, further preferably 5-9 mass %, and even more preferably 7-9 mass %. On the other hand, in order to sufficiently reduce the devitrification temperature, the $B_2O_3$ content is preferably 5-15 mass %, more preferably 6-13 mass %, and even more preferably 7 to less than 11 mass %. It should be noted that the $B_2O_3$ content is determined as appropriate with consideration given to both the aforementioned meltability etc. and the devitrification temperature.

RO, which is the total amount of MgO, CaO, SrO, and BaO, in the glass substrate according to the third embodiment of the present invention is in a range of 3-25 mass %. RO is an essential component that reduces the specific resistance and improves meltability. If the RO content is too low, the specific resistance will increase, and meltability will deteriorate. If the RO content is too high, the strain point will drop, and the Young's modulus will decrease. The density will also increase. Further, if the RO content is too high, the coefficient of thermal expansion tends to increase. From this standpoint, RO is in a range of 3-25 mass %, and the range thereof is preferably 3-16 mass %, more preferably 3-15 mass %, further preferably 3-14 mass %, even more preferably 3-13 mass %, further more preferably 6-12 mass %, and further more preferably 8-11 mass %.

In the glass substrate according to the third embodiment of the present invention, MgO is a component that reduces the specific resistance and improves meltability, and among alkaline-earth metals, MgO is a component that is less prone to increase specific gravity, and so by relatively increasing the content thereof, it is possible to facilitate density reduction. MgO is not essential, but by including same, meltability can be improved and the creation of cutting swarf can be inhibited. However, if the MgO content is too high, the devitrification temperature of glass will increase sharply, and thus, formability will deteriorate (and devitrification resistance will deteriorate). Further, if the MgO content is too high, BHF resistance tends to deteriorate, and also acid resistance tends to deteriorate. Particularly in cases where it is desired to reduce the devitrification temperature, it is preferable that MgO is substantially not included. From this standpoint, the MgO content is 0-15 mass %, preferably 0-10 mass %, more preferably 0-5 mass %, further preferably 0-4 mass %, even more preferably 0-3 mass %, further preferably 0 to less than 2 mass %, and even more preferably 0-1 mass %, and it is most preferable that MgO is substantially not included.

In the glass substrate according to the third embodiment of the present invention, CaO is a component that reduces the specific resistance and that is also effective in improving the meltability of glass without sharply increasing the devitrification temperature of glass. Further, among alkaline-earth metals, CaO is a component that is less prone to increase specific gravity, and so by relatively increasing the content thereof, it is possible to facilitate density reduction. CaO is not essential, but by including same, it is possible to improve the increase in meltability due to a reduction in the specific resistance of the glass melt and a reduction in melting temperature and also improve devitrification characteristics, and so, it is preferable to include CaO.

On the other hand, if the CaO content is too high, the strain point tends to drop. Also, the coefficient of thermal expansion tends to increase, and the density tends to increase. The range of CaO content is preferably 0-20 mass %, more preferably 0-15 mass %, further preferably 1-15 mass %, even more preferably 3.6-15 mass %, further more preferably 4-14 mass %, further more preferably 5-12 mass %, further more preferably 5-10 mass %, further more preferably greater than 6 to 10 mass %, and most preferably greater than 6 to 9 mass %.

In the glass substrate according to the third embodiment of the present invention, SrO and BaO are components that reduce the specific resistance of the glass melt, reduce the melting temperature, improve meltability, and reduce the devitrification temperature. They are not essential, but by including same, devitrification resistance and meltability are improved. However, if the content is too high, the density will increase. From the standpoint of achieving density reduction and weight reduction, the range of SrO+BaO, which is the total amount of SrO and BaO, is 0-15 mass %, preferably 0-10 mass %, more preferably 0-9 mass %, even more preferably 0-8 mass %, further more preferably 0-3 mass %, further more preferably 0-2 mass %, further more preferably 0-1 mass %, further more preferably 0-0.5 mass %, and further more preferably 0 to less than 0.1 mass %. In cases where it is desired to reduce the density of the glass, it is preferable that SrO and BaO are substantially not included.

The content of $Fe_2O_3$ in the glass substrate according to the third embodiment of the present invention is in a range of 0.01-1 mass %.

$Fe_2O_3$ functions as a refining agent, and it is also an essential component that reduces the specific resistance of the glass melt. By including the aforementioned predetermined amount of $Fe_2O_3$ in a glass that has a high melting temperature (high-temperature viscosity) and that is difficult to melt, the specific resistance of the glass melt can be reduced, and glass melting becomes possible while avoiding the occurrence of the problem regarding the erosion/wear of the melting tank at the time of melting through direct electrical heating. However, if the $Fe_2O_3$ content is too high, the glass gets tinted and the transmittance deteriorates. So, the $Fe_2O_3$ content is in a range of 0.01-1 mass %, and the range thereof is preferably 0.01-0.5 mass %, more preferably 0.01-0.4 mass %, further preferably 0.01-0.3 mass %, even more preferably 0.01-0.2 mass %, further more preferably 0.01-0.1 mass %, and further more preferably 0.02-0.07 mass %.

In the glass substrate according to the third embodiment of the present invention, the content of $Sb_2O_3$ is preferably 0-0.3 mass %, and more preferably 0-0.1 mass %, from the standpoint of reducing environmental load. Moreover, from the standpoint of further reducing environmental load, it is more preferable that the glass substrate according to the third embodiment of the present invention substantially does not comprise $Sb_2O_3$ and also substantially does not comprise $As_2O_3$.

The glass composition, physical properties, size, etc. of the glass substrate according to the third embodiment of the present invention, except for those mentioned above, may be the same as those for the glass substrate according to the first embodiment of the present invention.

The glass substrates of the present invention (same for the glass substrates according to the first to third embodiments of the present invention) are suitable as glass substrates for flat panel displays, and particularly as glass substrates for flat panel displays on which p-Si TFTs are formed on the surface thereof. Specifically, the present glass substrates are suitable as glass substrates for liquid crystal displays and glass substrates for organic EL displays. Particularly, the present glass substrates are suitable as glass substrates for p-Si TFT liquid crystal displays. Among the above, the present glass substrates are suitable as glass substrates for displays in mobile terminals that call for high definition.

Method for Manufacturing Glass Substrate for p-Si TFT Flat Panel Display:

A method for manufacturing a glass substrate for a p-Si TFT flat panel display (glass substrate according to the first embodiment of the present invention) according to the present invention involves:

a melting step of obtaining a molten glass by melting, by employing at least direct electrical heating, glass raw materials blended so as to provide a glass comprising 52-78 mass % of $SiO_2$,
3-25 mass % of $Al_2O_3$,
3-15 mass % of $B_2O_3$,
3-25 mass % of RO, wherein RO is total amount of MgO, CaO, SrO, and BaO,
0.01-1 mass % of $Fe_2O_3$, and
0-0.3 mass % of $Sb_2O_3$, and substantially not comprising $As_2O_3$, the glass having a mass ratio $(SiO_2+Al_2O_3)/B_2O_3$ in a range of 7-30 and a mass ratio $(SiO_2+Al_2O_3)/RO$ equal to or greater than 6;

a forming step of forming the molten glass into a flat-plate glass; and an annealing step of annealing the flat-plate glass.

An example of a method for manufacturing a glass substrate according to the first embodiment of the present invention encompasses a method for manufacturing a glass substrate involving:

a melting step of obtaining a molten glass by melting, by employing at least direct electrical heating, glass raw materials blended so as to provide a glass comprising 52-78 mass % of $SiO_2$,
3-25 mass % of $Al_2O_3$,
3-15 mass % of $B_2O_3$,
3-13 mass % of RO, wherein RO is total amount of MgO, CaO, SrO, and BaO, and
0.01-1 mass % of $Fe_2O_3$, and substantially not comprising $Sb_2O_3$ and $As_2O_3$, the glass having a mass ratio $(SiO_2+Al_2O_3)/B_2O_3$ in a range of 8.9-20 and a mass ratio $(SiO_2+Al_2O_3)/RO$ equal to or greater than 7.5;

a forming step of forming the molten glass into a flat-plate glass; and an annealing step of annealing the flat-plate glass.

The glass substrates according to the second and third embodiments of the present invention can be manufactured through the same steps as the glass substrate according to the first embodiment of the present invention. Note, however, that the glass raw materials used in the glass substrate in manufacturing the glass substrate of the second embodiment of the present invention are glass raw materials that provide a glass comprising 52-78 mass % of $SiO_2$, 3-25 mass % of $Al_2O_3$, 3-15 mass % of $B_2O_3$, 3-13 mass % of RO, wherein RO is total amount of MgO, CaO, SrO, and BaO, and 0.01-1 mass % of $Fe_2O_3$, and substantially not comprising $Sb_2O_3$ and $As_2O_3$. The glass raw materials used in manufacturing the glass substrate of the third embodiment of the present invention are glass raw materials that provide a glass comprising 57-75 mass % of $SiO_2$, 8-25 mass % of $Al_2O_3$, 3-15 mass % of $B_2O_3$, 3-25 mass % of RO, wherein RO is total amount of MgO, CaO, SrO, and BaO, 0-15 mass % of MgO, 0-20 mass % of CaO, 0-3 mass % of a total amount of SrO and BaO, 0.01-1 mass % of $Fe_2O_3$, and 0-0.3 mass % of $Sb_2O_3$, the glass substantially not comprising $As_2O_3$. Further, the glass raw materials used in an example of a method for manufacturing the glass substrate according to the third embodiment of the present invention are glass raw materials that provide a glass comprising 57-75 mass % of $SiO_2$, 8-25 mass % of $Al_2O_3$, 3 to less than 10 mass % of $B_2O_3$, 3-25 mass % of RO, wherein RO is total amount of MgO, CaO, SrO, and BaO, 0-15 mass % of MgO, 0-20 mass % of CaO, 0-3 mass % of a total amount of SrO and BaO, and 0.01-1 mass % of $Fe_2O_3$, the glass substantially not comprising $Sb_2O_3$ and $As_2O_3$.

Melting Step:

In the melting step, the glass raw materials blended so as to have a predetermined glass composition are melted by employing at least direct electrical heating. The glass raw materials can be selected as appropriate from known materials. It is preferable to adjust the glass composition, particularly the $Fe_2O_3$ content, in a manner such that the specific resistance of the glass melt at 1550° C. falls in a range of 50-300 Ω·cm. By adjusting the RO content to fall in a range of 3-15 mass % and the $Fe_2O_3$ content to fall in a range of 0.01-1 mass %, the specific resistance at 1550° C. can be set within the aforementioned range.

Further, it is preferable to adjust the melting step in a manner such that the β-OH value of the glass substrate falls within 0.05-0.4 $mm^{-1}$. It should be noted that, in manufacturing the glass substrate according to the second embodiment of the present invention, the RO content can be adjusted in a range of 3-13 mass %.

Forming Step:

In the forming step, the molten glass that has been melted in the melting step is formed into a flat-plate glass. Suitable methods for forming into a flat-plate glass include, for example, down-draw processing, and particularly overflow down-draw processing. Other methods, such as float processing, re-draw processing, and roll-out processing, can also be employed. By adopting down-draw processing, the principal surfaces of the obtained glass substrate are made by hot forming and will thus become extremely smooth compared to other forming methods, such as float processing, and thus, the step of polishing the glass substrate surfaces after forming will become unnecessary. As a result, manufacturing costs can be reduced, and productivity can be improved. Furthermore, the principal surfaces of the glass substrate formed by employing down-draw processing have a uniform composition, and thus, etching can be performed uniformly at the time of etching. In addition, by performing forming by employing down-draw processing, it is possible to obtain a glass substrate having a microcrack-free surface state, and thus, the strength of the glass substrate itself can be improved.

Annealing Step:

By adjusting, as appropriate, the conditions employed at the time of annealing, the heat shrinkage rate of the glass substrate can be controlled. As described above, the heat shrinkage rate of the glass substrate is preferably equal to or less than 75 ppm, and more preferably equal to or less than 60 ppm, and in order to manufacture a glass substrate with equal to or less than 75 ppm, and more preferably equal to or less than 60 ppm, it is desirable to perform forming in a manner, for example, such that the temperature of the flat-plate glass is cooled in 20-120 seconds within the temperature range of from Tg to 100° C. below Tg, in the case of employing down-draw processing. If the time is shorter than 20 seconds, there are cases where the heat shrinkage amount cannot be reduced sufficiently. On the other hand, if the time is longer than 120 seconds, productivity will deteriorate, and the device for manufacturing glass (annealing furnace) will become huge. Alternatively, it is preferable to perform annealing (cooling) in a manner such that the average rate for cooling the flat-plate glass is between 50-300° C./minute in the temperature range of from Tg to 100° C. below Tg. If the cooling rate exceeds 300° C./minute, there are cases where the heat shrinkage amount cannot be reduced sufficiently. On the other hand, if the rate is below 50° C./minute, then productivity will deteriorate, and the device for manufacturing glass (annealing furnace) will become huge. The range of the cooling rate is preferably 50-300° C./minute, more preferably 50-200° C./minute, and even more preferably 60-120° C./minute. On the other hand, the heat shrinkage rate can also be reduced by separately providing a heat shrinkage reduction processing (offline annealing) step after the annealing step. The provision of an offline annealing step separate from the annealing step, however, gives rise to such problems as a reduction in productivity and sharp increase in costs. Thus, it is more preferable to bring the heat shrinkage rate within the predetermined range by performing a heat shrinkage reduction process (online annealing) of controlling the rate for cooling the flat-plate glass during the annealing step, as described above.

In the foregoing, the glass substrate of the present invention was described through an example of a glass substrate for a p-Si TFT flat panel display, but the glass substrate of the present invention may be employed for flat panel displays, and particularly p-Si flat panel displays. Moreover, the glass substrate of the present invention may be used as a glass for oxide semiconductor thin-film-transistor flat panel displays. That is, the glass substrate of the present invention may be used for flat displays manufactured by forming oxide semiconductor thin-film transistors on the substrate surface.

EXAMPLES

Hereinbelow, the present invention will be described in further detail according to Examples. The present invention, however, is not limited to the Examples.

Examples 1 to 34

Sample glasses of Examples 1 to 34 and Comparative Examples 1 to 2 were prepared according to the following procedure so as to have respective glass compositions as shown in Table 1. The devitrification temperature, Tg, the average coefficient of thermal expansion (α) in a range of 100-300° C., the heat shrinkage rate, the density, the strain point, the melting temperature (glass temperature when the viscosity is $10^{2.5}$ dPa·s; expressed as T (log(η)=2.5) in Table 1), the liquid-phase viscosity, the specific resistance at 1550° C., and the etching rate were found for the prepared sample glasses and sample glass substrates, and are shown in Table 1.

TABLE 1

| mass % | Examples | | | | | | | | |
|---|---|---|---|---|---|---|---|---|---|
| | 1 | 2 | 3 | 4 | 5 | 6 | 7 | 8 | 9 |
| SiO2 | 66.1 | 66.3 | 64.8 | 67.5 | 65.5 | 65.4 | 65.1 | 65.2 | 64.8 |
| B2O3 | 6.4 | 6.4 | 6.4 | 6.5 | 6.3 | 7.4 | 7.9 | 7.9 | 6.4 |
| Al2O3 | 17.4 | 17.4 | 18.8 | 15.9 | 17.2 | 17.2 | 17.1 | 17.2 | 18.8 |
| K2O | 0.24 | 0.24 | 0.24 | 0.24 | 0.24 | 0.24 | 0.24 | 0.24 | |
| MgO | | 0.7 | | | | | | 0.6 | |
| CaO | 9.6 | 8.6 | 9.5 | 9.6 | 10.5 | 9.5 | 9.4 | 8.6 | 9.5 |
| SrO | | | | | | | | | |
| BaO | | | | | | | | | |
| ZnO | | | | | | | | | |
| SnO2 | 0.2 | 0.2 | 0.2 | 0.2 | 0.2 | 0.2 | 0.2 | 0.2 | 0.2 |
| Fe2O3 | 0.05 | 0.05 | 0.05 | 0.06 | 0.05 | 0.05 | 0.05 | 0.05 | 0.33 |
| SiO2 + Al2O3 | 83.5 | 83.8 | 83.6 | 83.4 | 82.7 | 82.6 | 82.2 | 82.4 | 83.6 |
| RO | 9.6 | 9.3 | 9.5 | 9.6 | 10.5 | 9.5 | 9.4 | 9.2 | 9.5 |
| (SiO2 + Al2O3)/B2O3 | 13.0 | 13.0 | 13.1 | 12.9 | 13.0 | 11.2 | 10.4 | 10.4 | 13.1 |
| (SiO2 + Al2O3)/RO | 8.7 | 9.0 | 8.8 | 8.7 | 7.9 | 8.7 | 8.7 | 9.0 | 8.8 |
| CaO/RO | 1.00 | 0.92 | 1.00 | 1.00 | 1.00 | 1.00 | 1.00 | 0.93 | 1.00 |
| SiO2 − Al2O3/2 | 57.4 | 57.6 | 55.4 | 59.5 | 56.8 | 56.8 | 56.5 | 56.7 | 55.4 |
| β-OH | 0.12 | 0.13 | 0.12 | 0.13 | 0.12 | 0.11 | 0.11 | 0.12 | 0.12 |
| Strain point (° C.) | 716 | 709 | 726 | 711 | 711 | 707 | 699 | 692 | 739 |
| Heat shrinkage rate (ppm) | 36.2 | 36.9 | 18 | 22 | 22 | 43.7 | 48.4 | 52.0 | 16 |

TABLE 1-continued

| | | | | | | | | | |
|---|---|---|---|---|---|---|---|---|---|
| Specific resistance (1550° C.) [Ω·cm] | 211 | 215 | 213 | 210 | 197 | 213 | 214 | 217 | 91 |
| Devitrification temperature (° C.) | 1230 | 1228 | 1243 | 1238 | 1225 | 1213 | 1206 | 1206 | 1250.2 |
| Tg (° C.) | 776 | 769 | 782 | 767 | 767 | 766 | 757 | 751 | 789 |
| α (×10$^{-7}$) (100-300° C.) | 34.0 | 30.4 | 31.4 | 33.9 | 35.9 | 32.9 | 33.8 | 33.1 | 31.0 |
| Density (g/cm$^3$) | 2.41 | 2.40 | 2.41 | 2.39 | 2.42 | 2.39 | 2.39 | 2.39 | 2.41 |
| T (log η = 2.5) | 1632 | 1633 | 1625 | 1638 | 1620 | 1639 | 1611 | 1613 | 1652 |
| Liquid-phase viscosity | 5.0 | 5.0 | 4.9 | 4.9 | 5.0 | 5.1 | 5.2 | 5.0 | 4.9 |
| Etching rate (μm/h) | 65 | 65 | 70 | 60 | 68 | 67 | 69 | 69 | 71 |

| | Examples | | | | | | | | |
|---|---|---|---|---|---|---|---|---|---|
| mass % | 10 | 11 | 12 | 13 | 14 | 15 | 16 | 17 | 18 |
| SiO2 | 64.8 | 64.8 | 64.8 | 61.6 | 61.4 | 61.1 | 62.0 | 62.0 | 62.0 |
| B2O3 | 6.4 | 6.4 | 6.4 | 7.9 | 8.8 | 9.7 | 8.3 | 8.3 | 8.3 |
| Al2O3 | 18.8 | 18.8 | 18.8 | 20 | 19.6 | 19.0 | 19.4 | 19.4 | 19.4 |
| K2O | 0.30 | 0.09 | 0.18 | 0.29 | 0.24 | 0.24 | 0.24 | 0.00 | 0.30 |
| MgO | | | | | | | | | |
| CaO | 9.5 | 9.5 | 9.5 | 10 | 9.8 | 9.7 | 9.8 | 9.8 | 9.8 |
| SrO | | | | | | | | | |
| BaO | | | | | | | | | |
| ZnO | | | | | | | | | |
| SnO2 | 0.2 | 0.2 | 0.2 | 0.2 | 0.2 | 0.2 | 0.2 | 0.2 | 0.2 |
| Fe2O3 | 0.02 | 0.15 | 0.12 | 0.04 | 0.05 | 0.05 | 0.05 | 0.33 | 0.02 |
| SiO2 + Al2O3 | 83.6 | 83.6 | 83.6 | 81.5 | 81.0 | 80.1 | 81.4 | 81.4 | 81.4 |
| RO | 9.5 | 9.5 | 9.5 | 10.0 | 9.8 | 9.7 | 9.8 | 9.8 | 9.8 |
| (SiO2 + Al2O3)/B2O3 | 13.1 | 13.1 | 13.1 | 10.3 | 9.2 | 8.2 | 9.8 | 9.8 | 9.8 |
| (SiO2 + Al2O3)/RO | 8.8 | 8.8 | 8.8 | 8.2 | 8.3 | 8.3 | 8.3 | 8.3 | 8.3 |
| CaO/RO | 1.00 | 1.00 | 1.00 | 1.0 | 1.0 | 1.0 | 1.0 | 1.0 | 1.0 |
| SiO2 − Al2O3/2 | 55.4 | 55.4 | 55.4 | 51.6 | 51.6 | 51.7 | 52.3 | 52.3 | 52.3 |
| β-OH | 0.12 | 0.12 | 0.12 | 0.12 | 0.11 | 0.10 | 0.11 | 0.11 | 0.12 |
| Strain point (° C.) | 725 | 741 | 733 | 712 | 702 | 695 | 710 | 723 | 709 |
| Heat shrinkage rate (ppm) | 18 | 17 | 17 | 28 | 33 | 40 | 31 | 28 | 32 |
| Specific resistance (1550° C.) [Ω·cm] | 221 | 186 | 191 | 137 | 133 | 142 | 129 | 68 | 134 |
| Devitrification temperature (° C.) | 1241.1 | 1247.4 | 1244.7 | 1230 | 1220 | 1193 | 1236 | 1243 | 1234 |
| Tg (° C.) | 780 | 786 | 784 | 763 | 754 | 741 | 760 | 767 | 758 |
| α (×10$^{-7}$) (100-300° C.) | 32.0 | 31.1 | 31.4 | 36.0 | 35.9 | 36.1 | 36.0 | 35.6 | 36.6 |
| Density (g/cm$^3$) | 2.41 | 2.41 | 2.41 | 2.40 | 2.41 | 2.40 | 2.42 | 2.42 | 2.42 |
| T (log η = 2.5) | 1623 | 1644 | 1633 | 1587 | 1582 | 1567 | 1579 | 1606 | 1577 |
| Liquid-phase viscosity | 4.9 | 4.9 | 4.9 | 4.6 | 4.7 | 4.9 | 4.6 | 4.6 | 4.6 |
| Etching rate (μm/h) | 70 | 71 | 70 | 80 | 82 | 83 | 80 | 81 | 80 |

| | Examples | | | | | | | | |
|---|---|---|---|---|---|---|---|---|---|
| mass % | 19 | 20 | 21 | 22 | 23 | 24 | 25 | 26 | 27 |
| SiO2 | 62.0 | 62.0 | 61.9 | 62.2 | 62.5 | 59.6 | 66.3 | 61.0 | 60.6 |
| B2O3 | 8.3 | 8.3 | 8.3 | 8.3 | 8.4 | 8.0 | 6.8 | 10.2 | 10.1 |
| Al2O3 | 19.4 | 19.4 | 19.8 | 19.8 | 19.9 | 19.0 | 17.9 | 17.8 | 19.2 |
| K2O | 0.09 | 0.18 | 0.24 | 0.24 | 0.24 | 0.23 | 0.24 | 0.24 | 0.24 |
| MgO | | | 0.6136 | 1.8497 | 3.0978 | | | | |
| CaO | 9.8 | 9.8 | 9.0 | 7.3 | 5.6 | 5.4 | 8.5 | 10.5 | 9.6 |
| SrO | | | | | | 7.6 | | | |
| BaO | | | | | | | | | |
| ZnO | | | | | | | | | |
| SnO2 | 0.2 | 0.2 | 0.2 | 0.2 | 0.2 | 0.2 | 0.2 | 0.2 | 0.2 |
| Fe2O3 | 0.15 | 0.12 | 0.05 | 0.05 | 0.05 | 0.05 | 0.05 | 0.05 | 0.05 |
| SiO2 + Al2O3 | 81.4 | 81.4 | 81.6 | 82.0 | 82.4 | 78.6 | 84.2 | 78.8 | 79.8 |
| RO | 9.8 | 9.8 | 9.6 | 9.2 | 8.7 | 13.0 | 8.5 | 10.5 | 9.6 |
| (SiO2 + Al2O3)/B2O3 | 9.8 | 9.8 | 9.8 | 9.8 | 9.8 | 9.8 | 12.4 | 7.8 | 7.9 |
| (SiO2 + Al2O3)/RO | 8.3 | 8.3 | 8.5 | 8.9 | 9.4 | 6.1 | 9.9 | 7.5 | 8.3 |
| CaO/RO | 1.0 | 1.0 | 0.9 | 0.8 | 0.6 | 0.4 | 1.0 | 1.0 | 1.0 |
| SiO2 − Al2O3/2 | 52.3 | 52.3 | 52.0 | 52.2 | 52.5 | 50.1 | 57.4 | 52.1 | 51.0 |
| β-OH | 0.11 | 0.11 | 0.11 | 0.11 | 0.12 | 0.12 | 0.12 | 0.11 | 0.11 |
| Strain point (° C.) | 725 | 717 | 708 | 697 | 691 | 703 | 731 | 681 | 693 |
| Heat shrinkage rate (ppm) | 29 | 30 | 32 | 37 | 38 | 33 | 23 | 47 | 39 |

TABLE 1-continued

| | | | | | | | | | |
|---|---|---|---|---|---|---|---|---|---|
| Specific resistance (1550° C.) [Ω·cm] | 111 | 114 | 132 | 130 | 128 | 138 | 207 | 179 | 191 |
| Devitrification temperature (° C.) | 1240 | 1238 | 1260 | 1294 | 1324 | 1221 | 1235 | 1196 | 1208 |
| Tg (° C.) | 764 | 762 | 758 | 749 | 746 | 758 | 781 | 731 | 743 |
| α (×10$^{-7}$) (100-300° C.) | 35.7 | 36.0 | 34.4 | 33.3 | 32.8 | 38.2 | 33.3 | 37.2 | 36 |
| Density (g/cm$^3$) | 2.42 | 2.42 | 2.41 | 2.40 | 2.40 | 2.48 | 2.38 | 2.40 | 2.40 |
| T (log η = 2.5) | 1598 | 1587 | 1585 | 1580 | 1577 | 1595 | 1640 | 1554 | 1560 |
| Liquid-phase viscosity | 4.6 | 4.6 | 4.4 | 4.2 | 4.0 | 4.8 | 4.9 | 4.7 | 4.6 |
| Etching rate (μm/h) | 81 | 80 | 83 | 81 | 79 | 83 | 64 | 83 | 85 |

| | Examples | | | | | | | Comparative Examples | |
|---|---|---|---|---|---|---|---|---|---|
| mass % | 28 | 29 | 30 | 31 | 32 | 33 | 34 | 1 | 2 |
| SiO2 | 62.4 | 62.6 | 61.4 | 62.9 | 62.6 | 60.0 | 63.7 | 60.7 | 65.5 |
| B2O3 | 5.2 | 3.8 | 6.5 | 3.8 | 4.3 | 4.6 | 11.3 | 11.7 | 12.7 |
| Al2O3 | 18.6 | 20.2 | 20.2 | 19.4 | 20.2 | 21.2 | 16.8 | 16.9 | 17.2 |
| K2O | 0.24 | 0.25 | 0.25 | 0.25 | 0.25 | 0.24 | 0.01 | 0.25 | |
| MgO | 3.4 | 2.5 | 3.7 | 3.7 | 4.3 | 3.5 | | 1.7 | |
| CaO | 1.2 | 10.4 | 7.7 | 9.6 | 6.9 | 7.3 | 6.7 | 5.8 | 4.4 |
| SrO | 8.7 | | | | 0.6 | 1.6 | 1.3 | 2.7 | |
| BaO | | | | | 0.5 | | | | |
| ZnO | | | | | | | 1.4 | | |
| SnO2 | 0.2 | 0.2 | 0.2 | 0.2 | 0.2 | 0.2 | 0.2 | 0.19 | 0.19 |
| Fe2O3 | 0.02 | 0.01 | 0.01 | 0.01 | 0.01 | 0.01 | 0.01 | 0.08 | |
| SiO2 + Al2O3 | 81.0 | 82.9 | 81.6 | 82.3 | 82.8 | 81.2 | 80.5 | 77.6 | 82.7 |
| RO | 13.4 | 12.9 | 11.4 | 13.4 | 11.9 | 12.4 | 8.0 | 10.2 | 4.4 |
| (SiO2 + Al2O3)/B2O3 | 15.6 | 22.0 | 12.6 | 21.6 | 19.2 | 17.8 | 7.1 | 6.6 | 6.5 |
| (SiO2 + Al2O3)/RO | 6.1 | 6.4 | 7.1 | 6.2 | 7.0 | 6.6 | 10.1 | 7.6 | 19.0 |
| CaO/RO | 0.1 | 0.8 | 0.7 | 0.7 | 0.6 | 0.6 | 0.8 | 0.6 | 1.0 |
| SiO2 − Al2O3/2 | 53.1 | 52.5 | 51.3 | 53.2 | 52.5 | 49.5 | 55.4 | 52.2 | 56.9 |
| β-OH | 0.11 | 0.11 | 0.11 | 0.12 | 0.12 | 0.12 | 0.11 | 0.1 | 0.1 |
| Strain point (° C.) | 711 | 720 | 700 | 709 | 709 | 705 | 685 | 660 | 675 |
| Heat shrinkage rate (ppm) | 27 | 43 | 52 | 50 | 51 | 59 | 30 | 114 | 30 |
| Specific resistance (1550° C.) [Ω·cm] | 236 | 88 | 112 | 66 | 96 | 105 | 250 | 165 | 326 |
| Devitrification temperature (° C.) | 1215 | 1286 | 1211 | 1244 | 1226 | 1221 | 1246 | 1196 | 1362 |
| Tg (° C.) | 768 | 770 | 751 | 759 | 759 | 757 | 735 | 707 | 725 |
| α (×10$^{-7}$) (100-300° C.) | 33.6 | 36.0 | 34.5 | 35.0 | 35.6 | 37.0 | 30.7 | 34.3 | 23.4 |
| Density (g/cm$^3$) | 2.52 | 2.47 | 2.45 | 2.49 | 2.48 | 2.51 | 2.36 | 2.40 | 2.31 |
| T (log η = 2.5) | 1553 | 1531 | 1537 | 1526 | 1534 | 1527 | 1650 | 1529 | 1636 |
| Liquid-phase viscosity | 4.7 | 4.0 | 4.6 | 4.3 | 4.5 | 4.4 | 4.3 | 4.6 | 3.9 |
| Etching rate (μm/h) | 73 | 80 | 87 | 82 | 84 | 90 | 72 | 82 | 67 |

Preparation of Sample Glass:

First, by using silica, alumina, boron oxide, potassium carbonate, basic magnesium carbonate, calcium carbonate, strontium carbonate, tin dioxide, and ferric oxide, which are ordinary glass raw materials, glass raw material batches (referred to hereinafter as "batches") were blended so as to achieve the respective glass compositions shown in Table 1. It should be noted that the materials were blended so that each glass amounted to 400 g.

Each blended batch was molten and refined in a platinum crucible. First, the batch was molten by keeping the crucible for 4 hours in an electric furnace set to 1575° C. Then, the glass melt was subjected to refining by raising the temperature of the electric furnace to 1640° C. and keeping the platinum crucible therein for 2 hours. Then, the glass melt was poured out onto an iron plate outside the furnace and was cooled and solidified, to obtain a glass body. The glass body was then subjected to an annealing process. The annealing process was performed by: keeping the glass body for 2 hours in another electric furnace set to 800° C.; cooling the glass body to 740° C. in 2 hours, and then to 660° C. in 2 hours; and then turning off the electric furnace and cooling the glass body to room temperature. The glass body subjected to this annealing process was employed as a sample glass. The sample glass was used for measuring properties (devitrification temperature, high-temperature viscosity (melting temperature), specific resistance, coefficient of thermal expansion, Tg, and strain point) that are not affected by annealing conditions and/or that cannot be measured in the form of a substrate. The sample glass had a Cl content of less than 0.01% and an $NH_4^+$ content of less than 2×10$^{-4}$%.

Further, the sample glass was cut, ground, and polished, to prepare a 30-by-40-by-0.7-mm sample glass substrate having mirror-finished top and bottom surfaces. The sample glass substrate was used for measuring β-OH which is not affected by annealing conditions.

Further, the sample glass was cut, ground, and polished and formed into a rectangular parallelepiped that is 0.7-4 mm thick, 5 mm wide, and 20 mm long. The rectangular parallelepiped was kept at Tg for 30 minutes, cooled to 100° C. below Tg at a rate of 100° C./min, and then left to cool to room temperature. This was used as a sample glass substrate for heat shrinkage measurement.

Strain Point:

The sample glass was cut and ground into a square prism whose sides are 3 mm and length is 55 mm, and this was used as a test piece. The test piece was subjected to measurement by using a beam bending measurement device (product of Tokyo Kogyo Co., Ltd.), and the strain point was found by calculation according to the beam bending method (ASTM C-598).

Heat Shrinkage Rate:

The heat shrinkage rate was found according to the following equation by using the glass-substrate shrinkage amount found after the aforementioned sample glass substrate for heat shrinkage measurement was subjected to a heat treatment for 2 hours at 550° C.

$$\text{Heat shrinkage rate (ppm)} = \{\text{Amount of shrinkage of glass before and after heat treatment/Length of glass before heat treatment}\} \times 10^6.$$

Specifically, in the present Examples, the shrinkage amount was measured according to the following method.

With respect to the aforementioned sample glass substrate for heat shrinkage, the temperature was raised from room temperature to 550° C., was kept for 2 hours, and was then cooled to room temperature, and the amount of shrinkage of the sample glass before and after the heat treatment was measured by using a differential dilatometer (Thermo Plus2 TMA8310). At this time, the rate for raising and lowering the temperature was set to 10° C./min.

Specific Resistance at 1550° C.:

The specific resistance of the sample glass at the time of melting was measured through the four-terminal method by using the 4192A LF Impedance Analyzer, a product of Hewlett Packard. The specific resistance value at 1550° C. was calculated from the measurement result.

Method for Measuring Devitrification Temperature:

The sample glass was pulverized, to obtain glass particles that pass through a 2380-μm sieve but remain on a 1000-μm sieve. The glass particles were immersed into ethanol, subjected to ultrasonic cleaning, and then dried in a constant-temperature oven. Then, 25 g of the dried glass particles were placed on a platinum board that is 12 mm wide, 200 mm long, and 10 mm deep, so that they assume a substantially constant thickness. The platinum board was placed in an electric furnace having a temperature gradient of 1080-1320° C. (or 1140-1380° C.) and kept therein for 5 hours. Then, the board was taken out from the furnace, and devitrification that occurred inside the glass was observed with an optical microscope at a magnification of 50 times. The maximum temperature at which devitrification was observed was found as the devitrification temperature.

Method for Measuring Average Coefficient of Thermal Expansion α and Tg within Range of 100-300° C.:

The sample glass was processed into a circular cylinder 5 mm in diameter and 20 mm long, to obtain a test piece. The temperature of the test piece while raising the temperature thereof and the expansion/shrinkage amount of the test piece were measured by using a differential dilatometer (Thermo Plus2 TMA8310). The temperature rise rate at this time was 5° C./min. On the basis of the measurement results of the temperature and the expansion/shrinkage amount of the test piece, the average coefficient of thermal expansion and Tg within the temperature range of 100-300° C. were found. It should be noted that, herein, "Tg" is a value found by performing measurement on a sample glass obtained by: keeping a glass body for 2 hours in another electric furnace set to 800° C.; cooling the glass body to 740° C. in 2 hours, and then to 660° C. in 2 hours; and then turning off the electric furnace and cooling the glass body to room temperature.

Density:

The density of the glass was measured according to the Archimedean method.

Melting Temperature:

The high-temperature viscosity of the sample glass was measured with a platinum-sphere drawing-up-type automatic viscometer.

The melting temperature was found by calculating, from the measurement result, the temperature when the viscosity is $10^{2.5}$ dPa·s.

Liquid-Phase Viscosity:

The liquid-phase viscosity was found by calculating the viscosity at the devitrification temperature from the result of measuring the high-temperature viscosity. Table 1 only shows the exponent n of the liquid-phase viscosity which is expressed as $10^n$ dPa·s.

Etching Rate:

The glass substrate was immersed for 1 hour in a 40° C. etching solution consisting of a mixed acid having an HF proportion of 1 mol/kg and an HCl proportion of 5 mol/kg, and the amount of reduction in thickness (μm) on one surface of the glass substrate was measured. The etching rate (μm/h) was found as the amount of reduction (μm) per unit time (1 hour).

Glass raw materials blended to provide the respective glass compositions shown in Examples 7 and 13 were melted at 1560-1640° C., subjected to refining at 1620-1670° C., and stirred at 1440-1530° C. by using a continuous melting device having a melting tank made of refractory brick and an adjustment tank (refining tank) made of a platinum alloy. The glass was then formed into a 0.7-mm-thick thin plate through overflow down-draw processing. The plate was annealed at an average rate of 100° C./min within the temperature range of from Tg to 100° C. below Tg, to obtain a glass substrate for a liquid crystal display (organic EL display). It should be noted that the aforementioned properties were measured by using the obtained glass substrate.

The glass substrate obtained as above and having the composition of Example 7 had a melting temperature of 1610° C., a β-OH value of 0.20 mm$^{-1}$, a Tg of 754° C., a strain point of 697° C., and a heat shrinkage rate of 51 ppm, and the other properties were the same as those of Example 7. The glass substrate having the composition of Example 13 had a melting temperature of 1585° C., a β-OH value of 0.21 mm$^{-1}$, a Tg of 761° C., a strain point of 710° C., and a heat shrinkage rate of 31 ppm, and the other properties were the same as those of Example 23. As described above, the glass substrates had a Tg of 720° C. or higher and a melting temperature of 1680° C. or lower, indicating that high low-temperature-viscosity characteristic temperatures and excellent meltability were achieved. Moreover, the heat shrinkage rate and devitrification temperature both satisfied the conditions of the glass substrate of the present invention. It should be noted that the glass substrates obtained as above have β-OH values that are 0.09 mm$^{-1}$ greater than Examples 7 and 13, so their Tg values are 2-3° C. lower than Examples 7 and 13, but still, sufficiently high Tg can be achieved. Thus, the glass substrates obtained according to the present Examples can be considered to be glass substrates having excellent properties and capable of being used for displays to which p-Si TFTs are applied.

Industrial Applicability

The present invention is applicable in the field of manufacturing glass substrates for displays.

What is claimed is:

1. A method of manufacturing a glass substrate for a flat panel display, the method comprising:
    a melting step of melting, by employing at least direct electrical heating, glass raw materials blended so as to provide a glass comprising:
    52-78 mass % of $SiO_2$,
    3-25 mass % of $Al_2O_3$,
    3-15 mass % of $B_2O_3$,
    3-25 mass % of RO, wherein RO is total amount of MgO, CaO, SrO, and BaO,
    0.01-1 mass % of $Fe_2O_3$, and
    0-0.3 mass % of $Sb_2O_3$, and substantially not comprising $As_2O_3$,
    the glass having a mass ratio $(SiO_2+Al_2O_3)/B_2O_3$ in a range of 7-30 and a mass ratio $(SiO_2+Al_2O_3)/RO$ equal to or greater than 6;
    a forming step of forming the molten glass into a flat-plate glass; and
    an annealing step of annealing the flat-plate glass,
    wherein a heat shrinkage reduction process is performed in the annealing step, the heat shrinkage reduction process being a process in which cooling rate in a central section of the flat-plate glass is set to 50-300° C./minute within a temperature range of from Tg to 100° C. below Tg.

2. The method of manufacturing a glass substrate according to claim 1, wherein the glass substantially does not comprise $Sb_2O_3$.

3. The method of manufacturing a glass substrate according to claim 1, wherein:
    the content of $SiO_2$ is 58-72 mass %;
    the content of $Al_2O_3$ is 10-23 mass %; and
    the content of $B_2O_3$ is from 3 to less than 11 mass %.

4. The method of manufacturing a glass substrate according to claim 1, wherein:
    total content of $SiO_2$ and $Al_2O_3$ is equal to or greater than 75 mass %;
    total content of RO, ZnO, and $B_2O_3$ is 7 to less than 20 mass %; and
    the content of $B_2O_3$ is 3 to less than 11 mass %.

5. The method of manufacturing a glass substrate according to claim 1, wherein the glass is a glass having 0.01-0.8 mass % of $R_2O$ content, wherein $R_2O$ is total amount of $Li_2O$, $Na_2O$, and $K_2O$.

6. The method of manufacturing a glass substrate according to claim 1, wherein the glass has a content of $ZrO_2$ of less than 0.2 mass %.

7. The method of manufacturing a glass substrate according to claim 1, wherein the glass has a total content of SrO and BaO of 0 to less than 2 mass %.

8. The method of manufacturing a glass substrate according to claim 1, wherein a heat shrinkage rate is equal to or less than 60 ppm, the heat shrinkage rate being expressed by the following equation:

$$\text{Heat shrinkage rate (ppm)} = \{\text{Amount of shrinkage of glass before and after heat treatment/Length of glass before heat treatment}\} \times 10^6. \quad \text{[Equation]}$$

9. The method of manufacturing a glass substrate according to claim 1, wherein the glass substrate is for a TFT liquid crystal display.

10. The method of manufacturing a glass substrate according to claim 1, wherein the glass comprises
    3-13 mass % of RO,
    substantially does not comprises $Sb_2O_3$, and
    has a mass ratio $(SiO_2+Al_2O_3)/B_2O_3$ in a range of 8.9-20 and a mass ratio $(SiO_2+Al_2O_3)/RO$ equal to or greater than 7.5.

11. The method of manufacturing a glass substrate according to claim 1, wherein a specific resistance of the molten glass in a molten state at 1550° C. is 50-300 Ω·cm.

12. The method of manufacturing a glass substrate according to claim 1, wherein a heat shrinkage reduction process of reducing the heat shrinkage rate of the glass substrate by controlling a cooling rate of the flat-plate glass is performed in the annealing step.

* * * * *